(12) United States Patent
Hashimoto et al.

(10) Patent No.: US 8,189,086 B2
(45) Date of Patent: May 29, 2012

(54) IMAGE SENSING APPARATUS AND IMAGE CAPTURING SYSTEM THAT PERFORMS A THINNING-OUT READOUT

(75) Inventors: Seiji Hashimoto, Yokohama (JP); Keisuke Ota, Tokyo (JP); Takeru Ohya, Machida (JP); Kazuyuki Shigeta, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 400 days.

(21) Appl. No.: 12/167,436

(22) Filed: Jul. 3, 2008

(65) Prior Publication Data

US 2009/0021621 A1 Jan. 22, 2009

(30) Foreign Application Priority Data

Jul. 20, 2007  (JP) ................. 2007-190118

(51) Int. Cl.
*H04N 3/14* (2006.01)
*H04N 5/335* (2006.01)
(52) U.S. Cl. ..................... 348/300; 348/222.1
(58) Field of Classification Search ............ 348/300
See application file for complete search history.

(56) References Cited

U.S. PATENT DOCUMENTS

| | | | | |
|---|---|---|---|---|
| 4,731,665 | A | 3/1988 | Hashimoto et al. | 358/213.27 |
| 4,959,723 | A | 9/1990 | Hashimoto | 358/213.11 |
| 4,962,412 | A | 10/1990 | Shinohara et al. | 357/30 |
| 5,146,339 | A | 9/1992 | Shinohara et al. | 358/212 |
| 5,283,428 | A | 2/1994 | Morishita et al. | 250/214.1 |
| 5,541,654 | A * | 7/1996 | Roberts | 348/301 |
| 7,623,174 | B2 * | 11/2009 | Kanamori et al. | 348/304 |
| 7,728,893 | B2 * | 6/2010 | Kagawa et al. | 348/302 |
| 2004/0169767 | A1 * | 9/2004 | Norita et al. | 348/350 |
| 2006/0290628 | A1 * | 12/2006 | Kondo | 345/90 |
| 2006/0290796 | A1 * | 12/2006 | Nikkanen et al. | 348/294 |
| 2007/0171298 | A1 * | 7/2007 | Kurane | 348/362 |
| 2007/0188632 | A1 * | 8/2007 | Kobayashi | 348/240.99 |
| 2008/0291304 | A1 * | 11/2008 | Ota et al. | 348/294 |
| 2009/0225189 | A1 * | 9/2009 | Morin | 348/229.1 |

FOREIGN PATENT DOCUMENTS

| | | |
|---|---|---|
| JP | 9-214836 A | 8/1997 |
| JP | 2001-346096 A | 12/2001 |
| JP | 2002-330329 A | 11/2002 |
| JP | 2003-143485 A | 5/2003 |
| JP | 2006-121151 A | 5/2006 |
| JP | 2007-074032 A | 3/2007 |

* cited by examiner

OTHER PUBLICATIONS

Japanese Office Action dated Jan. 23, 2012 in Japanese Application No. 2007-190118.

*Primary Examiner* — Jason Chan
*Assistant Examiner* — Cynthia Segura
(74) *Attorney, Agent, or Firm* — Fitzpatrick, Cella, Harper & Scinto

(57) ABSTRACT

An image sensing apparatus comprises: a pixel array; a selection unit which selects a readout region in the pixel array; and a readout unit which reads out a signal from the readout region, wherein in thinning-out readout, the readout unit reads out signals from a first readout region corresponding to the whole pixel array at a first pixel density in a first frame period and reads out signals from a second readout region corresponding to a part of the pixel array at a second pixel density in a second frame period, the second pixel density being higher than the first pixel density, and in thinning-out readout, the selection unit causes pixels in the first readout region to perform a charge accumulation operation for a first accumulation period and causes pixels in the second readout region to perform the charge accumulation operation for a second accumulation period.

11 Claims, 18 Drawing Sheets

IMAGE SENSING APPARATUS AND IMAGE CAPTURING SYSTEM THAT PERFORMS A THINNING-OUT READOUT

BACKGROUND OF THE INVENTION

1. Field of the Invention

The present invention relates to an image sensing apparatus and an image capturing system.

2. Description of the Related Art

Recently, image sensing apparatuses having 10,000,000 pixels or more are widely used. In movie shooting using such an image sensing apparatus, the time required for reading out signals from all pixels of the pixel array is long because of the large number of pixels. This decreases the number of sensed images per second (lowers the frame rate).

To prevent this, a technique has been proposed in which the time of signal readout from the pixel array is shortened by skipping and without reading out signals from some of the pixels of the pixel array (performing thinning-out readout) (Japanese Patent Laid-Open No. 9-214836). This technique makes it possible to increase the number of sensed images per second (increase the frame rate).

On the other hand, there is a demand for widening the dynamic range of an image signal in sensing an object. Particularly when an object has a high-luminance portion, electric charges accumulated in pixels corresponding to the high-luminance portion may be saturated. More specifically, a signal read out from the pixel array may reach the upper limit of the dynamic range and become saturated.

A technique has been proposed to solve this problem in which each pixel of the entire pixel array performs a long-time charge accumulation operation and a short-time charge accumulation operation, and a signal obtained by the long-time charge accumulation operation and that obtained by the short-time charge accumulation operation are synthesized (Japanese Patent Laid-Open No. 2001-346096). This technique enables to widen the dynamic range of a signal read out from the pixel array.

Another technique has been proposed, which executes a first electronic shutter operation for each pixel in a specific pixel region at part of the pixel array and then a second electronic shutter operation for each pixel in the region except the specific pixel region of the pixel array (Japanese Patent Laid-Open No. 2003-143485). This technique allows changing the charge accumulation period of the pixels between the specific pixel region and the region other than the specific pixel region.

The image sensing apparatus of Japanese Patent Laid-Open No. 9-214836 displays a partial image at a high resolution without performing thinning-out readout from the pixel region of interest while displaying the whole image at a low resolution by performing thinning-out readout from the entire pixel array.

Japanese Patent Laid-Open No. 9-214836 does not disclose the charge accumulation period of the entire pixel array and that of the pixels in the pixel region of interest to obtain the whole and partial images.

On the other hand, the techniques disclosed in Japanese Patent Laid-Open Nos. 2001-346096 and 2003-143485 read out signals from all pixels of the pixel array. If the technique of Japanese Patent Laid-Open No. 2001-346096 or 2003-143485 is applied to an image sensing apparatus having 10,000,000 pixels or more, the frame period for obtaining the signals of the whole image may be very long, and it may be impossible to achieve the frame rate necessary for movie shooting. That is, it is difficult to increase the frame rate in reading out a signal from the pixel array.

Japanese Patent Laid-Open No. 2001-346096 aims at reducing the size and cost of an image sensing apparatus, and the number of pixels of the image sensing apparatus tends to be smaller. For this reason, it is possible to achieve a sufficient frame rate without performing thinning-out readout in reading out a signal from the pixel array of the image sensing apparatus for movie shooting.

In Japanese Patent Laid-Open No. 2003-143485, signals by electric charges accumulated in the pixels of the pixel array are read out dot-sequentially. Such an arrangement supposedly requires a long time for the signal readout operation, and the number of pixels of the image sensing apparatus needs to be small for movie shooting. For this reason, if the number of pixels is small, it is possible to achieve a sufficient frame rate without performing thinning-out readout in reading out a signal from the pixel array of the image sensing apparatus for movie shooting.

SUMMARY OF THE INVENTION

The aim of the present invention is to increase the frame rate in reading out a signal from a pixel array, and to obtain an image by a signal accumulated for an appropriate time in each region, when the pixel array includes a plurality of regions having different pixel densities of the signal readout pixels.

According to the first aspect of the present invention, there is provided an image sensing apparatus comprising: a pixel array including a plurality of pixels arrayed in a row direction and a column direction; a selection unit which selects a readout region in the pixel array; and a readout unit which reads out a signal from the readout region selected by the selection unit, wherein in thinning-out readout, the readout unit reads out signals from a first readout region corresponding to the whole pixel array at a first pixel density in a first frame period and reads out signals from a second readout region corresponding to a part of the pixel array at a second pixel density in a second frame period, the second pixel density being higher than the first pixel density, and in thinning-out readout, the selection unit causes pixels in the first readout region to perform a charge accumulation operation for a first accumulation period and causes pixels in the second readout region to perform the charge accumulation operation for a second accumulation period.

According to the second aspect of the present invention, there is provided an image capturing system comprising the image sensing apparatus according to the first aspect of the present invention, an optical system which forms an image on an imaging plane of the image sensing apparatus, and a signal processing unit which processes a signal output from the image sensing apparatus to generate image data, wherein the signal processing unit determines the first accumulation period based on a luminance of a signal read out from the first readout region and controls the selection unit of the image sensing apparatus to cause the pixels in the first readout region to perform the charge accumulation operation for the first accumulation period, and determines the second accumulation period based on a luminance of a signal read out from the second readout region and controls the selection unit of the image sensing apparatus to cause the pixels in the second readout region to perform the charge accumulation operation for the second accumulation period.

According to the present invention, it is possible to increase the frame rate in reading out a signal from a pixel array, and to obtain an image by a signal accumulated for an appropriate time in each region, when the pixel array includes a plurality of regions having different pixel densities of the signal readout pixels.

Further features of the present invention will become apparent from the following description of exemplary embodiments with reference to the attached drawings.

DESCRIPTION OF THE EMBODIMENTS

Figure 1:
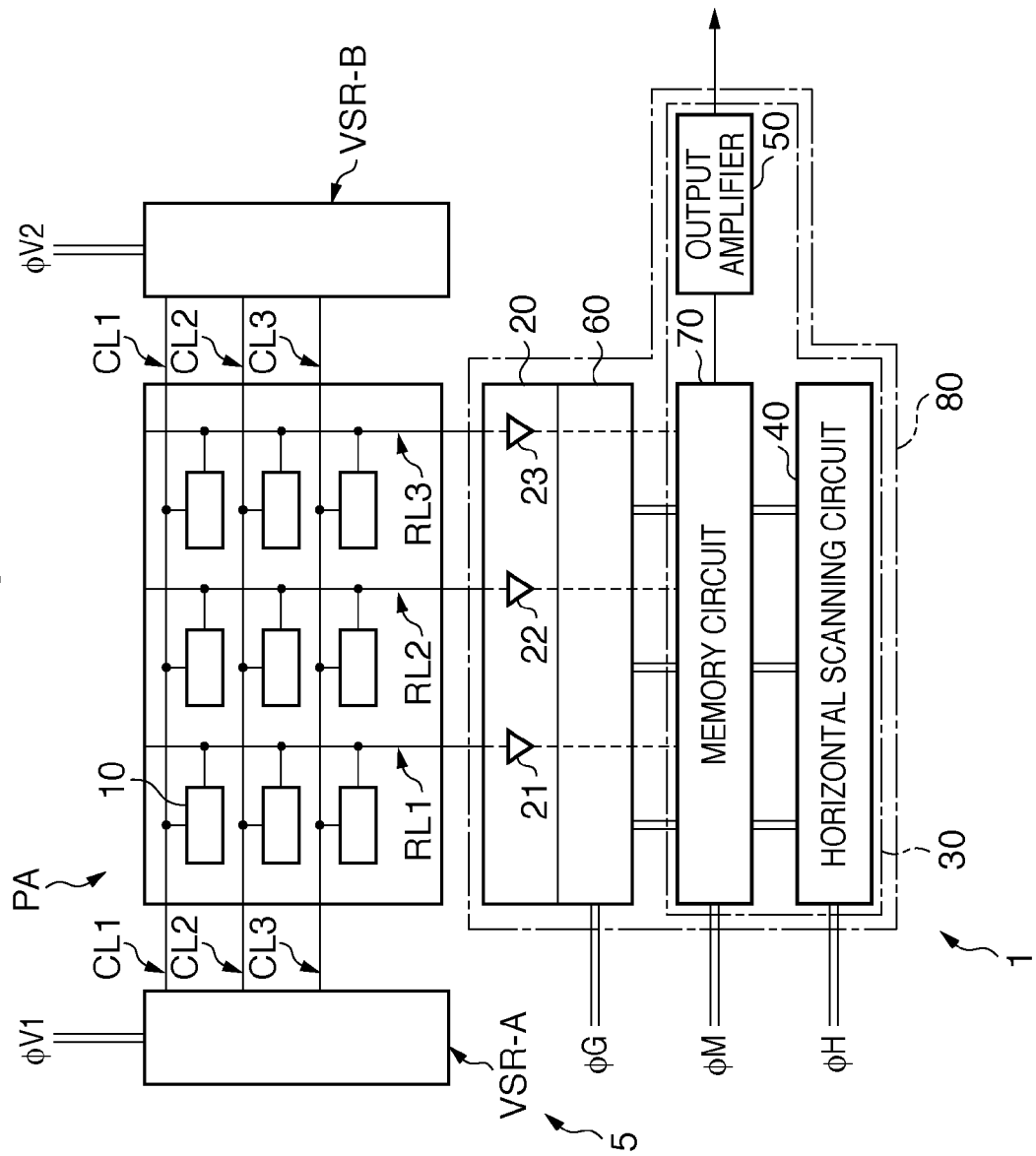
FIG. 1 is a diagram showing the arrangement of an image sensing apparatus 1 according to the first embodiment of the present invention.

The schematic arrangement and the operation of an image sensing apparatus 1 according to the first embodiment of the present invention will be described with reference to FIG. 1. FIG. 1 is a block diagram showing the arrangement of the image sensing apparatus 1 according to the first embodiment of the present invention. In FIG. 1, each of control signals φV1, φV2, φG, φM, and φH is shown as one pulse, though they may include a plurality of pulses.

The image sensing apparatus 1 includes a pixel array PA, selection unit 5, and readout unit 80. The image sensing apparatus 1 has a thinning-out readout mode for reading out signals from some pixels of the pixel array PA.

Figure 3:
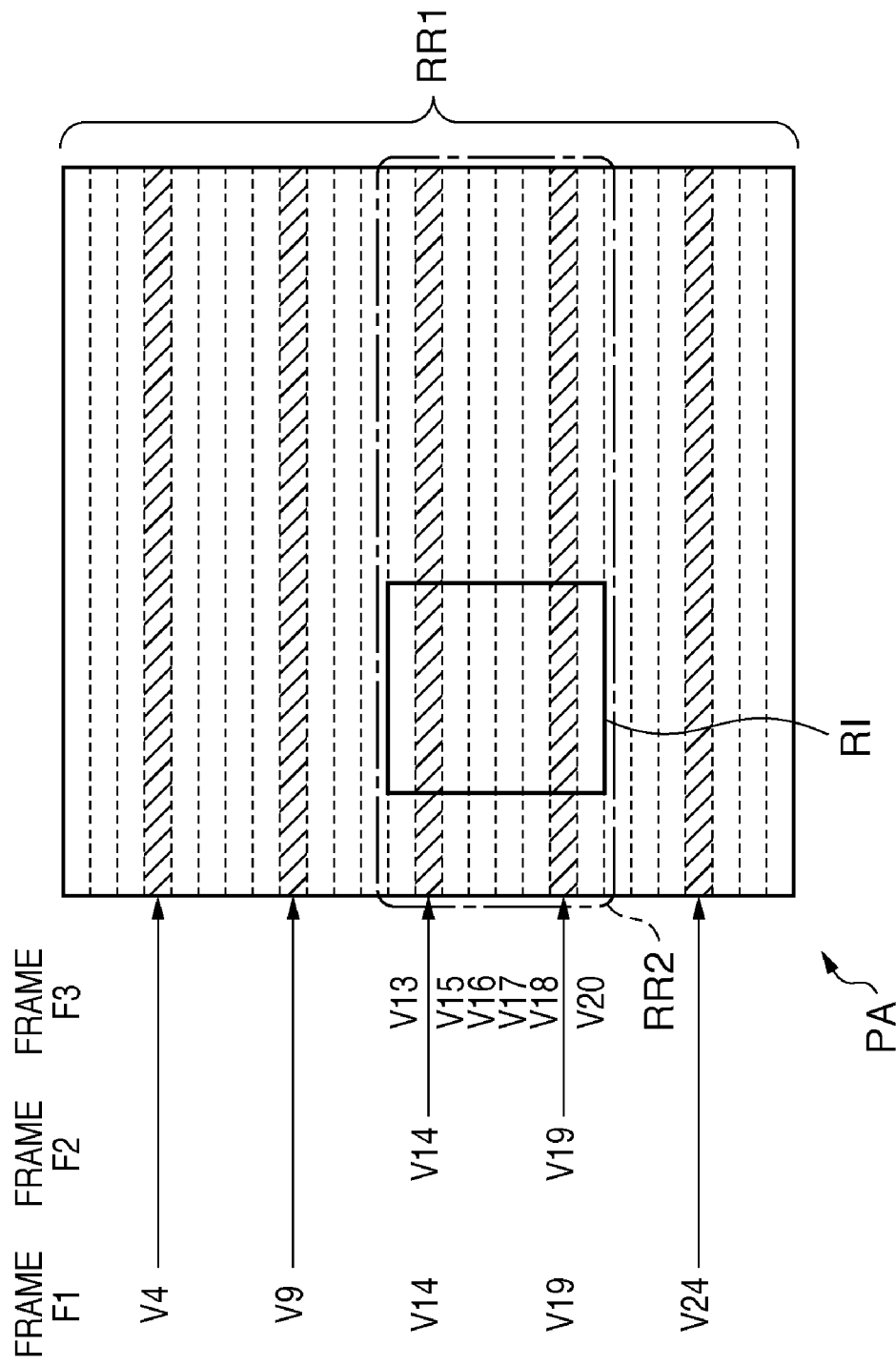
FIG. 3 is a view for explaining a readout region and a non-readout region in the pixel array PA.

In the pixel array PA, a plurality of pixels 10 are arrayed in the row and column directions. FIG. 1 shows a pixel array having 3 rows×3 columns. For the descriptive convenience, a pixel array having 3 rows×3 columns is illustrated here. In fact, the pixel array often includes a larger number of pixels, as shown in FIG. 3 to be described later.

In the thinning-out readout mode (when reading out signals while thinning out the pixels), the selection unit 5 selects some rows (group of readout rows) from the readout region and skips the remaining rows (group of non-readout rows).

In the thinning-out readout mode, the readout unit 80 reads out signals from the pixels of the readout rows selected by the selection unit 5.

The selection unit 5 includes vertical scanning circuits VSR-A and VSR-B.

The vertical scanning circuit VSR-A internally generates a scanning signal φVSR-A (FIGS. 6 and 7) in accordance with the control signal φV1. The vertical scanning circuit VSR-A generates a reset signal φRES-A, transfer signal φTX-A, and selection signal φSEL-A (FIG. 7) in accordance with the scanning signal φVSR-A. The vertical scanning circuit VSR-A sequentially supplies these control signals to the pixels of the respective rows of the pixel array PA via control lines CL1, CL2, CL3. For example, the vertical scanning circuit VSR-A supplies the active selection signal φSEL-A to one row of the pixel array PA to select the plurality of pixels included in the row of the pixel array PA. Then, the vertical scanning circuit VSR-A supplies the active transfer signal φTX-A to the pixels of the row to enable signal readout from the pixels. The vertical scanning circuit VSR-A enables signal readout from the pixels, thereby resetting them. That is, the vertical scanning circuit VSR-A enables signal readout from the pixels of the pixel array PA, thereby starting resetting the pixels and finishing a charge accumulation operation. The vertical scanning circuit VSR-A is, for example, a vertical scanning circuit.

For example, as shown in FIG. 3, the vertical scanning circuit VSR-A selects a first group of readout rows V4, V9, V14, V19, and V24 from a first readout region RR1 corresponding to the whole pixel array PA in a frame period F1 (first frame period). More specifically, the vertical scanning circuit VSR-A sequentially selects the rows V4, V9, V14, V19, and V24 included in the first group of readout rows. At this time, the vertical scanning circuit VSR-A skips rows V1 to V3, V5 to V8, V10 to V13, V15 to V18, V20 to V23, and V25 to V27 excluding the first group of readout rows in the entire pixel array PA.

Additionally, for example, as shown in FIG. 3, the vertical scanning circuit VSR-A selects a second group of readout rows V13 to V20 from a second readout region RR2 that is a part of the pixel array PA in a frame period F2 or F3 (second frame period). The second readout region RR2 includes a pixel region RI of interest.

More specifically, the vertical scanning circuit VSR-A sequentially selects the rows V14 and V19 which are included in both the first group of readout rows and the second group of readout rows in the frame period F2. At this time, the vertical scanning circuit VSR-A skips the rows V1 to V13, V15 to V18, and V20 to V27 excluding the rows V14 and V19 included in the second group of readout rows in the entire pixel array PA.

Then, the vertical scanning circuit VSR-A sequentially selects the rows V13, V15 to V18, and V20 which are not included in the first group of readout rows but included in the second group of readout rows in the frame period F3. The vertical scanning circuit VSR-A skips the rows V1 to V12, V14, V19, and V21 to V27 excluding the rows V13, V15 to V18, and V20 included in the second group of readout rows in the entire pixel array PA.

The vertical scanning circuit VSR-B internally generates a scanning signal φVSR-B (FIGS. 6 and 7) in accordance with the control signal φV2. The vertical scanning circuit VSR-B generates a reset signal φRES-B, transfer signal φTX-B, and selection signal φSEL-B (FIG. 7) in accordance with the scanning signal φVSR-B. The vertical scanning circuit VSR-B sequentially supplies these control signals to the pixels of the respective rows of the pixel array PA via the control lines CL1, CL2, CL3, . . . . For example, the vertical scanning circuit VSR-B supplies the active reset signal φRES-B and transfer signal φTX-B to the pixels to reset them. At this time, the vertical scanning circuit VSR-B inhibits signal readout from the pixels. The vertical scanning circuit VSR-B cancels the reset of the pixels of the pixel array PA, thereby starting the charge accumulation operation.

There is a predetermined time difference between the timing when the vertical scanning circuit VSR-B causes pixels to start the charge accumulation operation and the timing when the vertical scanning circuit VSR-A causes pixels to finish the charge accumulation operation. The vertical scanning circuit VSR-B cancels reset of the pixels of a predetermined row to start the charge accumulation operation ahead of the vertical scanning circuit VSR-A. After that, the vertical scanning circuit VSR-A reads out signals from the pixels of that row, thereby completing the charge accumulation operation. That is, it is possible to change the charge accumulation period of the pixels of a predetermined row by adjusting the timing when the vertical scanning circuit VSR-B cancels reset of the pixels and the timing when the vertical scanning circuit VSR-A reads out signals from the pixels.

For example, after the vertical scanning circuit VSR-B has canceled reset of pixels, the timing of the operation of causing the vertical scanning circuit VSR-A to allow signal readout from the pixels is advanced. That is, the time between the timing when the vertical scanning circuit VSR-B cancels reset of pixels and the timing when the vertical scanning circuit VSR-A enables signal readout from the pixels is shortened. This makes it possible to shorten the charge accumulation period of a pixel.

Figure 4:
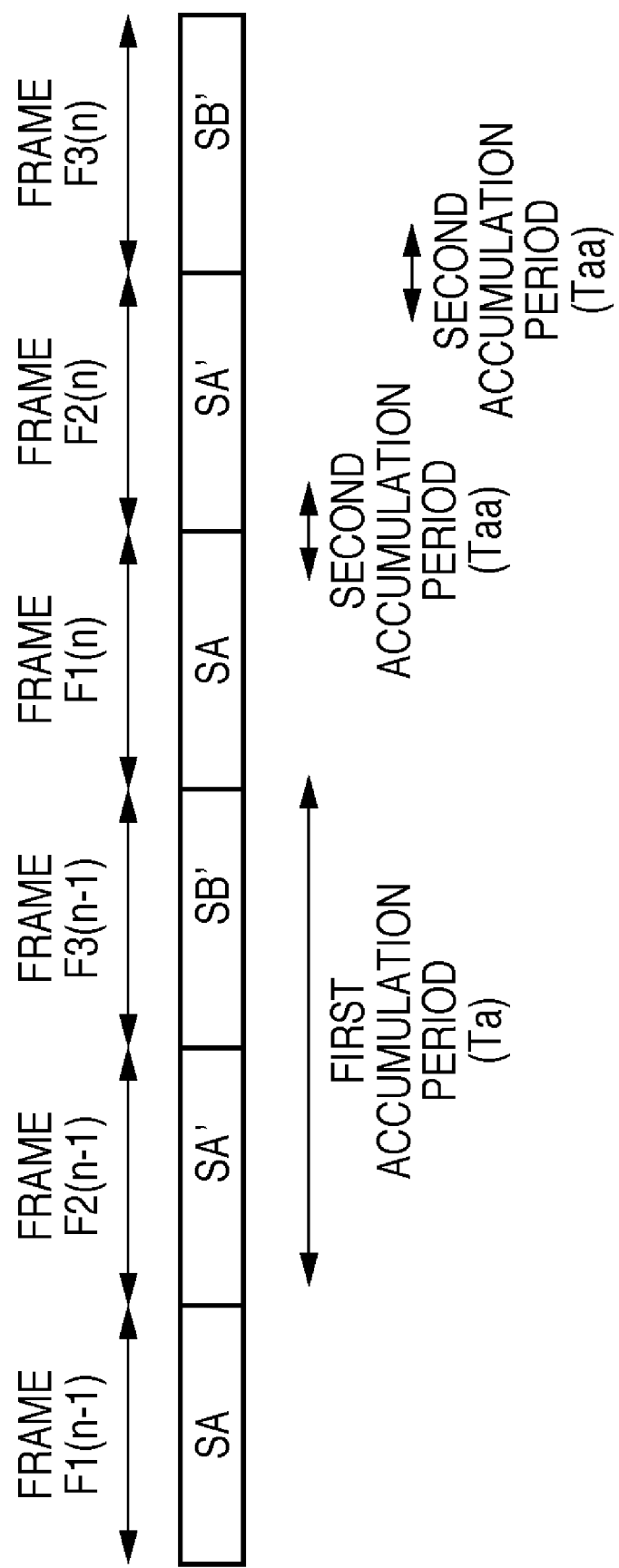
FIG. 4 is a view for explaining a charge accumulation period.

That is, the selection unit 5 makes the pixels of the first group of readout rows perform the charge accumulation operation for the first accumulation period and makes the pixels of the second group of readout rows perform the charge accumulation operation for the second accumulation period. More specifically, the selection unit 5 causes the pixels of the rows (V4, V9, and V24) which are included in the first group of readout rows but not included in the second group of readout rows to perform the charge accumulation operation for a first accumulation period Ta (FIG. 4). Additionally, the selection unit 5 causes the pixels of the rows (V14 and V19) which are included in both the first group of readout rows and the second group of readout rows to perform the charge accumulation operation for a first accumulation period Ta and a second accumulation period Taa (FIG. 4). The selection unit 5 causes the pixels of the rows (V13, V15 to V18, and V20) which are not included in the first group of readout rows but included in the second group of readout rows to perform the charge accumulation operation for the second accumulation period Taa.

The readout unit 80 reads out signals from the pixels of each column in the pixels of the group of readout rows selected by the vertical scanning circuit VSR-A and sequentially outputs the signals. No signals are read out from the pixels of the group of non-readout rows because the vertical scanning circuit VSR-A does not execute the readout operation for the pixels, as will be described later.

In, for example, the frame period F1 (FIG. 3), the readout unit 80 reads out signals from the pixels of each column, which are accumulated for the first accumulation period Ta, in the pixels of the rows (V4, V9, V14, V19, and V24) included in the first group of readout rows and sequentially outputs the signals. In this way, the readout unit 80 reads out signals from the first readout region RR1 corresponding to the whole pixel array PA at a first pixel density in the frame period F1. The first pixel density is obtained by dividing the number of rows of the first group of readout rows by the number of rows of the first readout region RR1. In the example shown in FIG. 3, the first pixel density is 5 rows÷27 rows≈0.19.

In the frame period F2, the readout unit 80 reads out signals from the pixels of each column, which are accumulated for the second accumulation period Taa, in the pixels of the rows (V14 and V19) included in the first and second groups of readout rows and sequentially outputs the signals. In the frame period F3, the readout unit 80 reads out signals from the pixels of each column, which are accumulated for the second accumulation period Taa, in the pixels of the rows (V13, V15 to V18, and V20) which are not included in the first group of readout rows but included in the second group of readout rows and sequentially outputs the signals. In this way, the readout unit 80 reads out signals from the second readout region RR2 that is a part of the pixel array PA at a second pixel density higher than the first pixel density in the frame period F2 or F3. The second pixel density is obtained by dividing the number of rows of the second group of readout rows by the number of rows of the second readout region RR2. In the example shown in FIG. 3, the second pixel density is 8 rows÷8 rows=1.0.

When reading out signals from the second readout region, signal readout from the rows V14 and V19 included in the first group of readout rows may be inhibited because their accumulation period is different from that of the pixels of the remaining rows in the second readout region. In this case, in the example shown in FIG. 3, the second pixel density is 6 rows÷8 rows=0.75.

The readout unit 80 includes a column amplification unit group 20, control circuit 60, and output unit 30.

The column amplification unit group 20 includes a plurality of column amplification units 21, 22, 23, . . . . The plurality of column amplification units 21, 22, 23, . . . amplify the signals of the pixels of columns which are transmitted via column signal lines RL1, RL2, RL3. Each of the column amplification units 21 and the like is, for example, a column amplifier.

The control circuit 60 receives the control signal φG and controls amplification factors of signal amplification of the plurality of column amplification units 21, 22, 23 in accordance with the control signal φG. Hence, the amplification factor of signal amplification of each of the plurality of column amplification units 21, 22, 23 is controlled for each row. The control circuit 60 collectively sets the amplification factor (gain) of the signals of the pixels of a row selected in each horizontal scanning period at a low speed. Hence, noise generated upon amplification factor switching is small.

The control circuit 60 may include circuit elements corresponding to the plurality of column amplification units 21, 22, 23 and control the amplification factor of each of the plurality of column amplification units 21, 22, 23 for each column. In this case, the amplification factor of each of the plurality of column amplification units 21, 22, 23 is controlled for each pixel.

In this embodiment, the signals of pixels in the first readout region RR1 corresponding to the whole pixel array PA and those of pixels in the second readout region RR2 corresponding to the pixel region RI of interest are read out in different frame periods. Accordingly, the control circuit 60 may change the amplification factors of the plurality of column amplification units 21, 22, 23 in each frame period.

The output unit 30 receives the signals amplified by the plurality of column amplification units 21, 22, 23 and sequentially outputs the signals. The output unit 30 includes a memory circuit 70, horizontal scanning circuit 40, and output amplifier 50. The memory circuit 70 temporarily stores the signals of the pixels of each column from the column amplification unit group 20. The horizontal scanning circuit 40 sequentially turns on switches in the memory circuit 70 corresponding to the respective columns to sequentially output the signals of the pixels of the columns, which are stored in the memory circuit 70, to the output amplifier 50.

Figure 2:
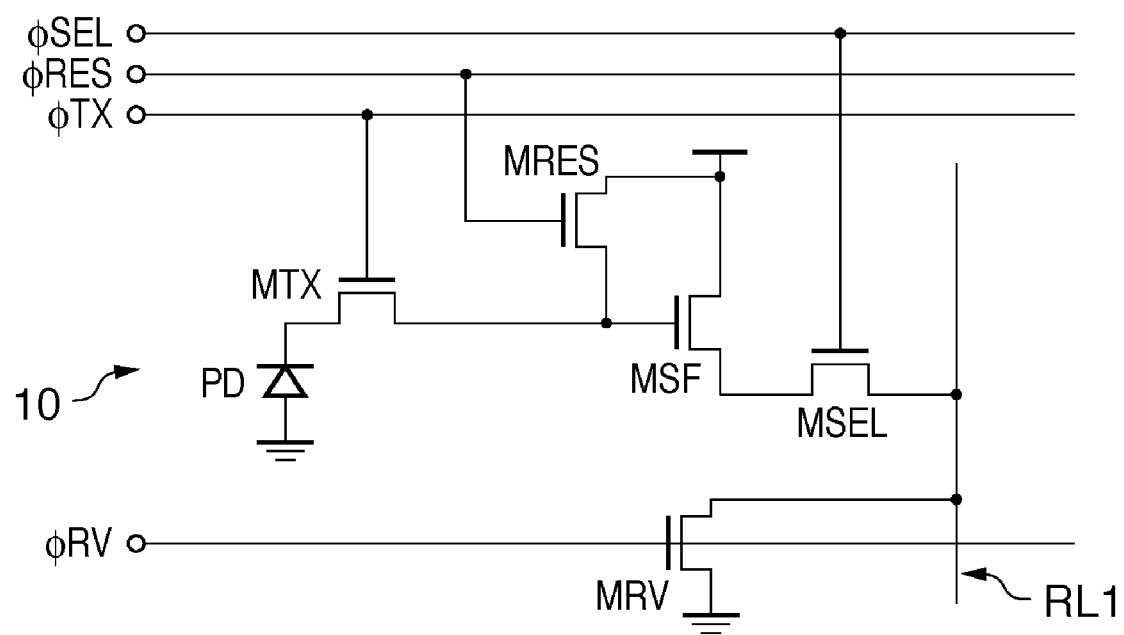
FIG. 2 is a circuit diagram showing the arrangement of each pixel 10 included in a pixel array PA.

The arrangement of each pixel 10 included in the pixel array PA will be described next with reference to FIG. 2. FIG. 2 is a circuit diagram showing the arrangement of the pixel 10.

The pixel 10 includes a photodiode PD, pixel amplifier MSF, transfer switch MTX, reset switch MRES, and selection switch MSEL.

The photodiode PD performs a charge accumulation operation of photoelectrically converting light and accumulating electric charges (signal).

The pixel amplifier MSF amplifies the signal accumulated in the photodiode PD. The pixel amplifier MSF is, for example, a MOS transistor. The pixel amplifier MSF operates as a source follower together with a constant current source MRV to amplify the signal input to the gate and supply it to the source. Note that the constant current source MRV is, for example, a MOS transistor. A signal φRV is supplied to the gate of the MOS transistor to make it operate as a constant current source.

The transfer switch MTX transfers the signal accumulated in the photodiode PD to the gate (floating diffusion) of the pixel amplifier MSF for a period when a transfer signal φTX is active. The transfer switch MTX is, for example, a MOS transistor. When the gate receives the active transfer signal φTX, the transfer switch MTX transfers electric charges accumulated in the photodiode PD to the gate of the pixel amplifier MSF.

The reset switch MRES resets the residual electric charges in the gate of the pixel amplifier MSF for a period when a reset signal φRES is active. The reset switch MRES is, for example, a MOS transistor. When the gate receives the active reset signal φRES, the reset switch MRES resets the gate of the pixel amplifier MSF to a potential corresponding to the power supply voltage supplied to the drain.

The selection switch MSEL transmits the signal supplied from the source of the pixel amplifier MSF to the column signal line RL1 for a period when a selection signal φSEL is active. The selection switch MSEL is, for example, a MOS transistor. When the gate receives the active selection signal φSEL, the selection switch MSEL transmits the signal supplied from the pixel amplifier MSF to the drain to the column signal line RL1.

Figure 5:
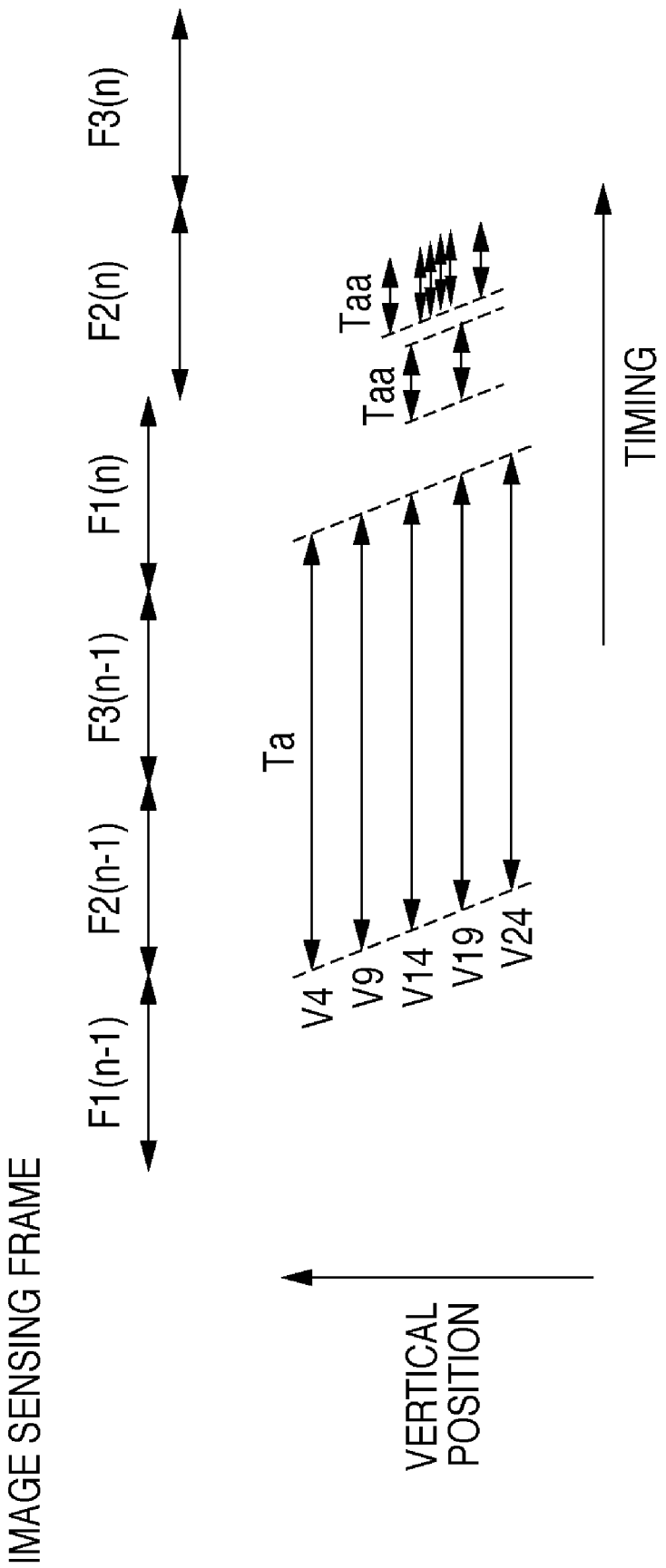
FIG. 5 is a view for explaining the slit rolling reset operation of the image sensing apparatus 1.
Figure 6:
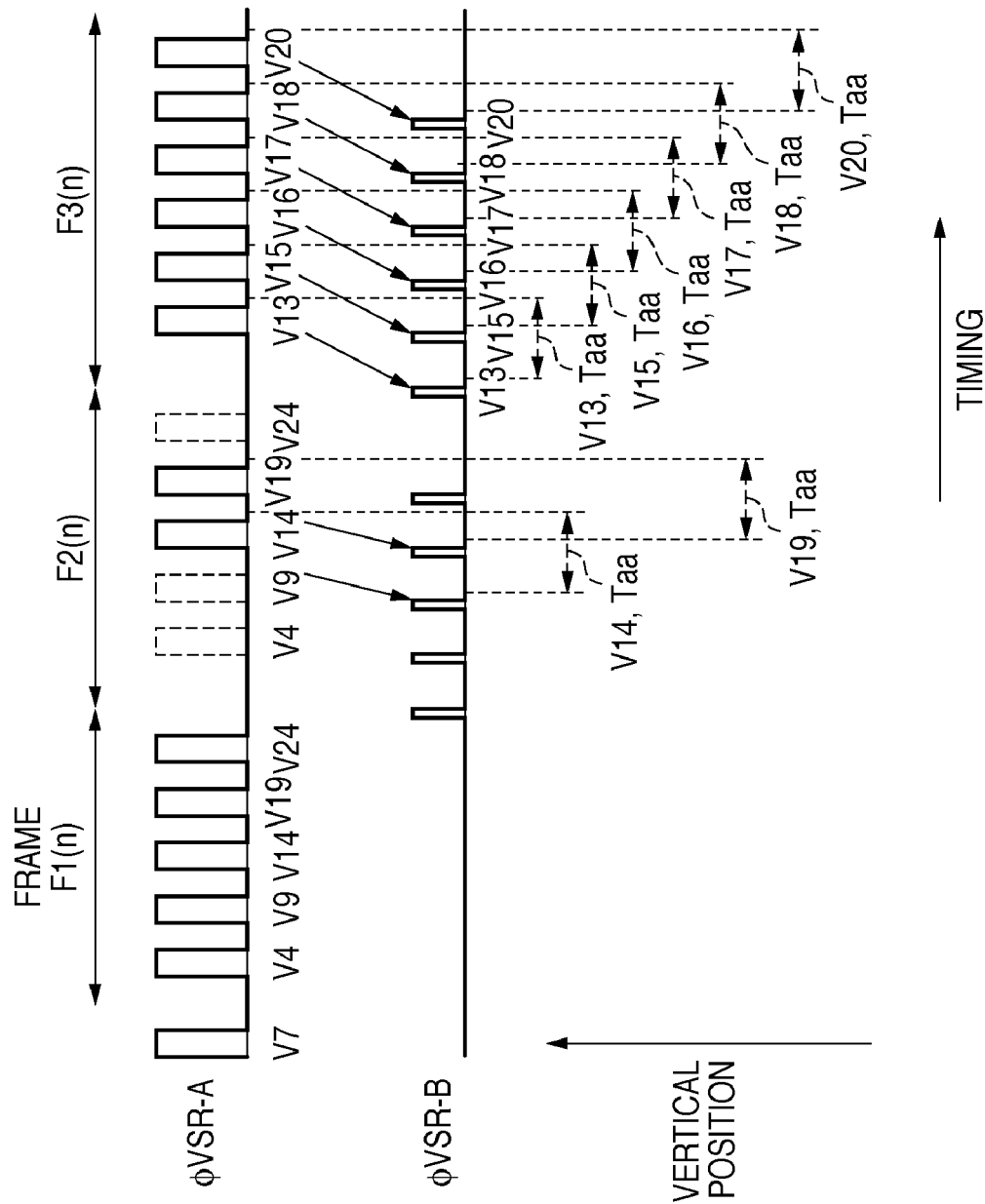
FIG. 6 is a view for explaining the slit rolling reset operation of the image sensing apparatus 1.

The schematic operation of the image sensing apparatus 1 will be described next with reference to FIGS. 3 to 6. FIG. 3 is a view for explaining the group of readout rows and the group of non-readout rows in the pixel array PA. FIG. 4 is a view for explaining the charge accumulation period. FIGS. 5 and 6 are views for explaining the slit rolling reset operation of the image sensing apparatus 1.

Assume that in the pixel array PA shown in FIG. 3, the pixel region RI of interest for sensing a portion of interest of an object is a high-luminance region. In this case, the region of the pixel array PA except the pixel region RI of interest is an average luminance region. Hence, the pixels of the rows (V4, V9, V24) which are included in the first group of readout rows but not included in the second group of readout rows perform the charge accumulation operation for the first accumulation period Ta (FIG. 4).

On the other hand, the pixel region RI of interest is a high-luminance region. For this reason, the pixels of the rows (V14 and V19) which are included in both the first group of readout rows and the second group of readout rows perform the charge accumulation operation for the first accumulation period Ta and the second accumulation period Taa (FIG. 4). The second group of readout rows includes a plurality of rows at least some of which overlap the pixel region RI of interest. Additionally, the pixels of the rows (V13, V15 to V18, and V20) which are not included in the first group of readout rows but included in the second group of readout rows perform the charge accumulation operation for the second accumulation period Taa.

In this example, signals are read out from the pixels of one out of five rows. That is, about ⅕ of all rows of the pixel array PA are read out by thinning out. It is therefore possible to read out signals even in an image sensing element having a total of, for example, 10,000,000 pixels at a movie corresponding speed about five times that in signal readout from all pixels. This allows obtaining a frame rate of a required level in reading out signals from the pixel array. The required level indicates a frame rate required in, for example, movie shooting.

The second accumulation period Taa is shorter than the first accumulation period Ta. For example, if the second accumulation period Taa is 1/100 the first accumulation period Ta, the dynamic range of signals read out from the pixel region RI of interest of the pixel array PA can be widened to 100 times, as compared to a case in which image sensing is done using only the first accumulation period Ta.

More specifically, the charge accumulation period of the pixels of a row selected in the pixel array PA is as shown in FIG. 4.

In the second previous frame period F2($n$−1), a signal (SA') is read out from each of the pixels of the rows (V4, V9, V14, V19, and V24) included in the first group of readout rows (the pixels are reset). After that, reset of the pixels is canceled. More specifically, the transfer switch MTX and reset switch MRES in the pixel 10 (FIG. 2) are turned on to reset the photodiode PD and the gate of the pixel amplifier MSF.

In the pixel 10, the reset switch MRES cancels the reset of the photodiode PD at the timing of turning off the transfer switch MTX. Accordingly, the pixels of, for example, the row V14 start the charge accumulation operation, and the first accumulation period Ta starts.

In the current frame period F1($n$), a signal (SA) is read out from each of the pixels included in the first group of readout rows (the pixels are reset). Accordingly, the pixels of, for example, the row V14 finish the charge accumulation operation, and the first accumulation period Ta finishes.

Signal readout from the pixels of the rows (V14 and V19) included in the first group of readout rows and the second group of readout rows is ended (the transfer switches are turned off). Accordingly, the pixels of, for example, the row V14 start the charge accumulation operation again, and the second accumulation period Taa starts.

In the frame period F2($n$), the signal (SA') is read out from each of the pixels of the rows (V14 and V19) included in the first group of readout rows and the second group of readout rows (the pixels are reset). Accordingly, the pixels of, for example, the row V14 finish the charge accumulation operation, and the second accumulation period Taa of the pixels finishes.

The signal from each of the pixels of the rows (V13, V15 to V18, and V20) which are not included in the first group of readout rows but included in the second group of readout rows is not read out to the readout circuit, and the pixels are reset. When reset of the pixels is ended, the pixels of, for example, the row V13 start the charge accumulation operation, and the second accumulation period Taa starts.

In the frame period F3(n), a signal (SB') is read out from each of the pixels of the rows (V13, V15 to V18, and V20) which are not included in the first group of readout rows but included in the second group of readout rows (the pixels are reset). Accordingly, the pixels of, for example, the row V13 finish the charge accumulation operation, and the second accumulation period Taa of the pixels finish.

That is, the image sensing apparatus 1 performs a slit rolling reset operation as shown in FIGS. 5 and 6. In FIGS. 5 and 6, the ordinate represents the vertical position in the pixel array PA, and the abscissa represents the timing. FIG. 6 also shows the scanning signal φVSR-A internally generated by the vertical scanning circuit VSR-A and the scanning signal φVSR-B internally generated by the vertical scanning circuit VSR-B.

As shown in FIG. 5, in the previous frame period F2(n−1), the rows (V4, V9, V14, V19, and V24) included in the first group of readout rows are sequentially selected, and the first accumulation period Ta of the pixels included in each row sequentially starts.

In the current frame period F1(n), the rows (V4, V9, V14, V19, and V24) included in the first group RR1 of readout rows are sequentially selected, and the first accumulation period Ta of the pixels included in each row sequentially finishes. The rows (V14 and V19) included in the first group RR1 of readout rows and the second group RR2 of readout rows are sequentially selected, and the second accumulation period Taa of the pixels included in each row sequentially starts (FIG. 6). For example, the vertical scanning circuit VSR-B resets the pixels of the row V14 in accordance with the scanning signal φVSR-B of the row V14 to start the charge accumulation operation and start the second accumulation period Taa of the row V14.

In the frame period F2(n), the rows (V14 and V19) included in the first group of readout rows and the second group of readout rows are sequentially selected, and the second accumulation period Taa of the pixels included in each row sequentially finishes (FIG. 6). For example, the selection unit VSR-A causes the pixels of the row V14 to finish the charge accumulation operation in accordance with the scanning signal φVSR-A of the row V14 and finish the second accumulation period Taa.

The rows (V13, V15 to V18, and V20) which are not included in the first group of readout rows but included in the second group of readout rows are sequentially selected, and the second accumulation period Taa of the pixels included in each row sequentially starts (FIG. 6). For example, the vertical scanning circuit VSR-B resets the pixels of the row V13 in accordance with the scanning signal φVSR-B of the row V13 to start the charge accumulation operation and start the second accumulation period Taa.

In the frame period F3(n), the rows (V13, V15 to V18, and V20) which are not included in the first group of readout rows but included in the second group of readout rows are sequentially selected, and the second accumulation period Taa of the pixels included in each row sequentially finishes (FIG. 6). For example, the selection unit VSR-A allows signal readout from the pixels of the row V13 in accordance with the scanning signal φVSR-A of the row V13 to finish the charge accumulation operation and finish the second accumulation period Taa of the row V13.

Note that the pixels of the rows (V13, V15 to V18, and V20) which are not included in the first group of readout rows but included in the second group of readout rows may further perform the charge accumulation operation for the first accumulation period Ta. That is, a frame period F5 may be provided between the frame period F2 and the frame period F3 shown in FIGS. 3 to 5. In this case, in the frame period F5, the rows (V13, V15 to V18, and V20) which are not included in the first group of readout rows but included in the second group of readout rows are sequentially selected, and the first accumulation period Ta of the pixels included in each row sequentially finishes (not shown). For example, the selection unit VSR-A causes the pixels of the row V13 to finish the charge accumulation operation in accordance with the scanning signal φVSR-A of the row V13 and finish the first accumulation period Ta of the row V13. This reduces blooming and smear in an image for monitoring a part of interest even when it includes both a high-luminance portion and a low-luminance portion.

The pixels of the rows (V4, V9, and V14) which are included in the first group of readout rows but not included in the second group of readout rows may further perform the charge accumulation operation for the second accumulation period Taa. In this case, in the frame period F2, the rows (V4, V9, V14, V19, and V24) which are included in the first group of readout rows are sequentially selected, and the second accumulation period Taa of the pixels included in each row sequentially finishes (not shown). For example, the selection unit VSR-A causes the pixels of the row V4 to finish the charge accumulation operation in accordance with the scanning signal φVSR-A of the row V4 and finish the second accumulation period Taa of the row V4. This reduces blooming and smear in an image for monitoring a part (e.g., background) except a part of interest even when the part except the part of interest includes both a high-luminance portion and a low-luminance portion.

Figure 7:
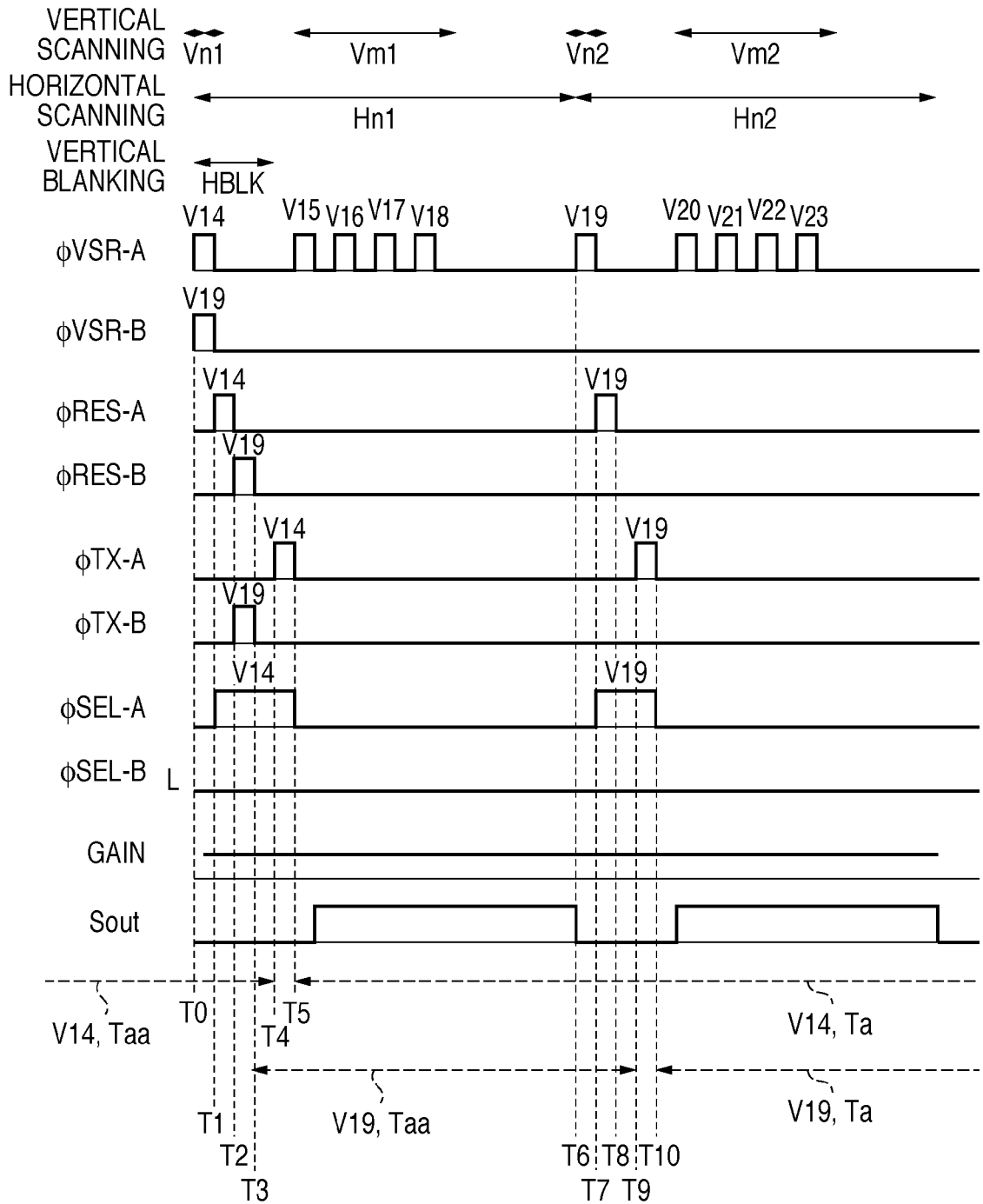
FIG. 7 is a timing chart showing the operation of the image sensing apparatus 1 in part of a frame period F2.

An operation when the image sensing apparatus 1 causes the pixels to perform the charge accumulation operation for the second accumulation period Taa will be described next with reference to FIG. 7. FIG. 7 is a timing chart showing the operation of the image sensing apparatus 1 in part of the frame period F2. Referring to FIG. 7, the frame period F2 includes horizontal scanning periods Hn1, Hn2, . . . as much as the rows to be selected.

At timing T0, the vertical scanning circuit VSR-A activates the scanning signal φVSR-A of the row V14, and the vertical scanning circuit VSR-B activates the scanning signal φVSR-B of the row V19. The horizontal scanning period Hn1, vertical scanning period Vn1, and horizontal blanking period HBLK start from this timing.

At timing T1, the vertical scanning circuit VSR-A supplies the active selection signal φSEL-A and reset signal φRES-A to the pixels of the row V14 in accordance with the scanning signal φVSR-A of the row V14. This turns on the selection switch MSEL and resets the gate (floating diffusion) of the pixel amplifier MSF in each pixel of the row V14. The vertical scanning circuit VSR-A also deactivates the scanning signal φVSR-A supplied to the pixels of the row V14, thereby finishing the vertical scanning period Vn1.

At timing T2, the vertical scanning circuit VSR-B supplies the active transfer signal φTX-B and reset signal φRES-B to the pixels of the row V19 in accordance with the scanning signal φVSR-B of the row V19. This turns on the transfer switch MTX and reset switch MRES and resets the photodiode PD and the gate of the pixel amplifier MSF in each pixel of the row V19. At this time, since the selection switch MSEL in each pixel of the row V19 is off, the signals of the pixels of the row V19 are not read out to the readout unit 80.

The vertical scanning circuit VSR-A also deactivates the reset signal φRES-A supplied to the pixels of the row V14, thereby finishing reset of the gate of the pixel amplifier MSF in each pixel of the row V14.

At timing T3, the vertical scanning circuit VSR-B deactivates the transfer signal φTX-B and reset signal φRES-B supplied to the pixels of the row V19. This cancels reset of the photodiode PD and the gate of the pixel amplifier MSF in each pixel of the row V19. The photodiode PD starts the charge accumulation operation, and the second accumulation period Taa of the pixels of the row V19 starts.

At timing T4, the vertical scanning circuit VSR-A supplies the active transfer signal φTX-A to the pixels of the row V14 in accordance with the scanning signal φVSR-A of the row V14. This turns on the transfer switch MTX in each pixel of the row V14 so that the signal accumulated in the photodiode PD is read out (the photodiode PD is reset), and the second accumulation period Taa of the pixels of the row V14 finishes.

At timing T5, the vertical scanning circuit VSR-A deactivates the transfer signal φTX-A supplied to the pixels of the row V14. This cancels reset of the photodiode PD in each pixel of the row V14, and the first accumulation period Ta of the pixels of the row V14 starts. This corresponds to the fact that the first accumulation period Ta of the row V14 starts in the frame period F2(n−1) in FIG. 5. The vertical scanning circuit VSR-A also deactivates the selection signal φSEL-A supplied to the pixels of the row V14. The horizontal blanking period HBLK finishes.

After that, in a vertical scanning period Vm1, the vertical scanning circuit VSR-A supplies the scanning signal φVSR-A without signal readout from the rows V15 to V18. In parallel, the horizontal scanning circuit 40 sequentially outputs the signals of the pixels of each column, which are held in the memory circuit 70, to the output amplifier 50.

At timing T6, the vertical scanning circuit VSR-A activates the scanning signal φVSR-A of the row V19. At this timing, the horizontal scanning period Hn1 finishes, and the horizontal scanning period Hn2 and vertical scanning period Vn2 start.

At timing T7, the vertical scanning circuit VSR-A supplies the active selection signal φSEL-A and reset signal φRES-A to the pixels of the row V19 in accordance with the scanning signal φVSR-A of the row V19. This resets the gate of the pixel amplifier MSF in each pixel of the row V19. The vertical scanning circuit VSR-A also deactivates the scanning signal φVSR-A of the row V19, thereby finishing the vertical scanning period Vn2.

At timing T8, the vertical scanning circuit VSR-A deactivates the reset signal φRES-A supplied to the pixels of the row V19. This finishes reset of the gate of the pixel amplifier MSF in each pixel of the row V19.

At timing T9, the vertical scanning circuit VSR-A supplies the active transfer signal φTX-A to the pixels of the row V19 in accordance with the scanning signal φVSR-A of the row V19. This turns on the transfer switch MTX in each pixel of the row V19 so that the signal accumulated in the photodiode PD is read out (the photodiode PD is reset), and the second accumulation period Taa of the pixels of the row V19 finishes.

At timing T10, the vertical scanning circuit VSR-A deactivates the transfer signal φTX-A supplied to the pixels of the row V19. This cancels reset of the photodiode PD in each pixel of the row V19, and the first accumulation period Ta of the pixels of the row V19 starts. This corresponds to the fact that the first accumulation period Ta of the row V19 starts in the frame period F2(n−1) in FIG. 5.

After that, in a vertical scanning period Vm2, the vertical scanning circuit VSR-A supplies the scanning signal φVSR-A without signal readout from the rows V20 to V23. In parallel, the horizontal scanning circuit 40 sequentially outputs the signals of the pixels of each column, which are held in the memory circuit 70, to the output amplifier 50.

In this way, the image sensing apparatus 1 can cause the pixels to perform the charge accumulation operation for the second accumulation period Taa almost equal to one horizontal scanning period.

As described above, the pixel array PA is driven such that the entire pixel array, that is, the first readout region RR1 includes the group of readout rows and the group of non-readout rows. This makes it possible to shorten the time for reading out a signal from the pixel array and increase the frame rate in reading out a signal from the pixel array.

The selection unit causes the pixels in the first readout region to perform the charge accumulation operation for the first accumulation period and the pixels in the second readout region to perform the charge accumulation operation for the second accumulation period. This allows obtaining an image by a signal accumulated for an appropriate time in each region even when the pixel array includes a plurality of regions where the signal readout pixels have different densities.

Hence, it is possible to reduce saturation of electric charges accumulated in pixels corresponding to a high-luminance portion by, for example, determining the accumulation period in accordance with the luminance of each region. This allows widening the dynamic range of signals read out from the entire pixel array and a part (pixel region of interest) of the pixel array.

In this case, even when the frame rate in reading out a signal from the pixel array is increased, and a part of interest is sensed at a high resolution, the dynamic range of the signal read out from the pixel region of interest of the pixel array can be widened. As a result, it is possible to monitor a region of interest at a high resolution without blooming using a partial image corresponding to a part (pixel region of interest) of the pixel array while monitoring a broader area at a low resolution based on an image corresponding to the entire pixel array. Hence, no mechanical operation using pan-tilt and zoom functions as in a current surveillance camera is necessary. It is therefore unnecessary to perform monitoring using a number of surveillance cameras.

Figure 8:
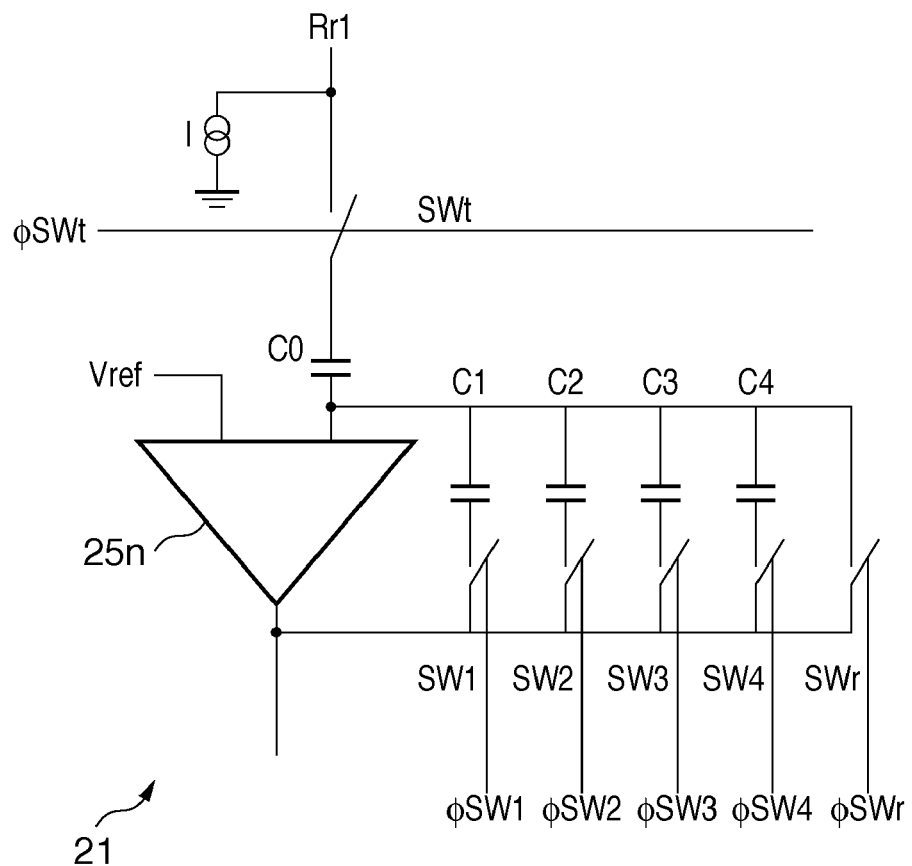
FIG. 8 is a circuit diagram showing an arrangement of a column amplification unit.

The control circuit 60 may generate control signals φSW1, φSW2, φSW3, φSW4, and φSWr shown in FIG. 8 in accordance with the control signal φG. More specifically, in the column amplification unit 21, capacitors C1-C4, and switches SW1-SW4, are connected to the input and output terminals of an amplifier 25n. The signals of the pixels of each column, which are transmitted via the column signal lines RL1, . . . , are supplied to an input terminal of the amplifier 25n via a capacitor C0. A reference voltage Vref is applied to the other input terminal. Hence, the amplification factor (gain) of the amplifier 25n can be changed in accordance with the number of switches SW1-SW4 which are turned on in accordance with the control signals φSW1, φSW2, φSW3, and φSW4. The amplifier 25n can be reset by activating the control signal φSWr.

Figure 9:
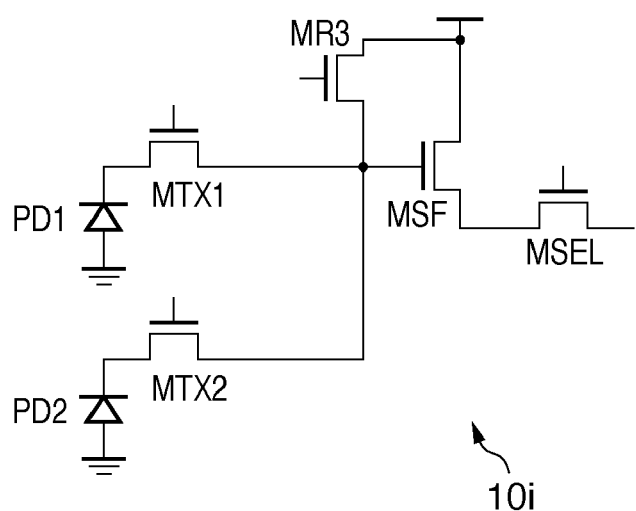
FIG. 9 is a circuit diagram showing the arrangement of each pixel 10i included in the pixel array PA (modification)

As shown in FIG. 9, a pixel 10i may have two photodiodes PD1 and PD2 and two transfer switches MTX1 and MTX2, which share the pixel amplifier MSF, reset switch MR3, and selection switch MSEL. In this case, the area of the pixel amplifier for one photodiode becomes small, and consequently, the opening ratio of the photodiode increases. The photodiodes PD1 and PD2 that share the pixel amplifier can be arranged in either the vertical or horizontal direction.

Figure 10:
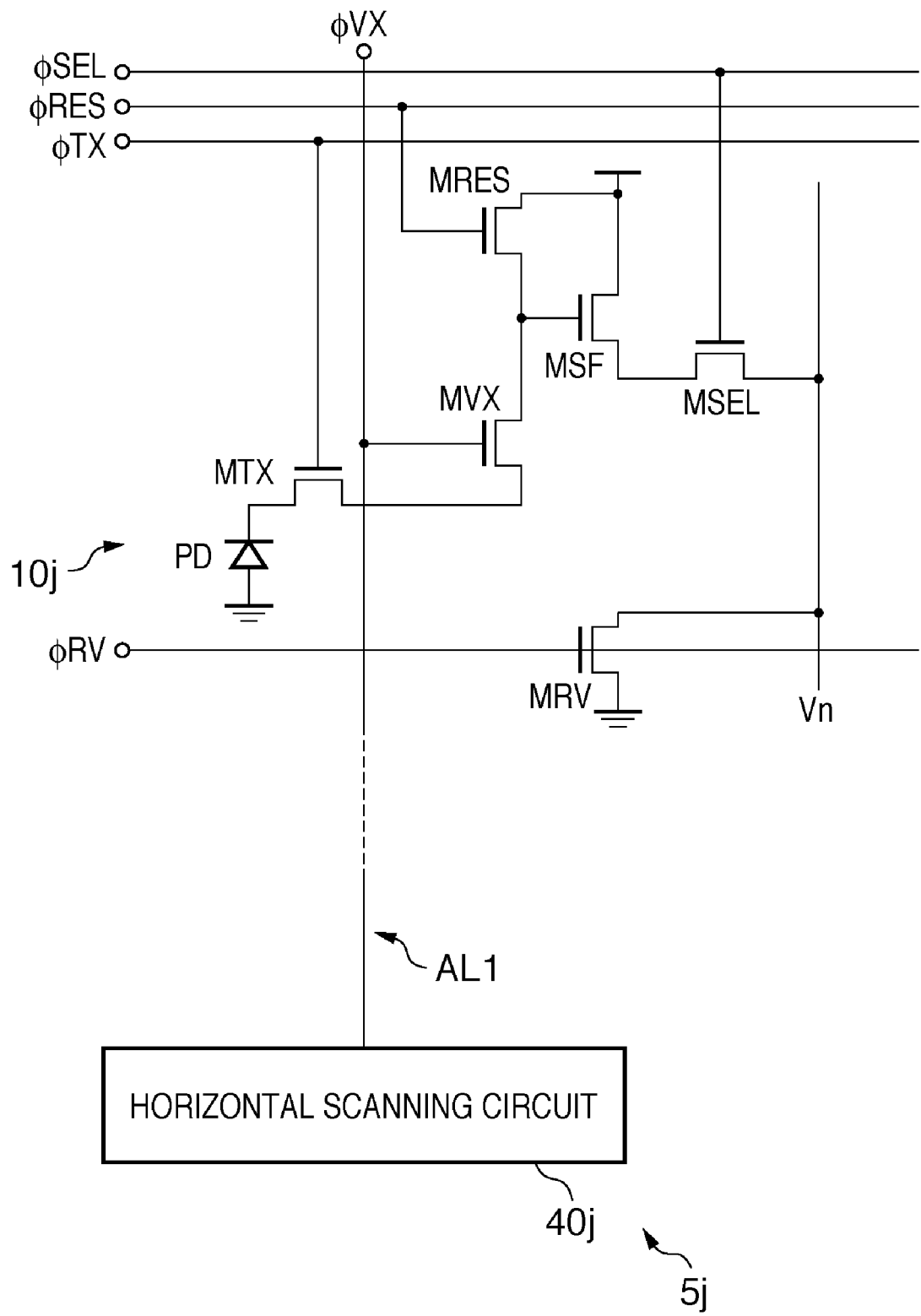
FIG. 10 is a circuit diagram showing the arrangement of each pixel 10j included in the pixel array PA (modification)

As shown in FIG. 10, a selection unit 5j may select pixels from the readout region in stead of selecting rows from the readout region. More specifically, the selection unit 5j includes a horizontal scanning circuit 40j in addition to the vertical scanning circuit VSR-A and vertical scanning circuit VSR-B. The horizontal scanning circuit 40j supplies a control signal φVX to a selection switch MVX in a pixel 10j via a control line AL1 . . . . The selection switch MVX is, for example, a MOS transistor. When the gate receives the active control signal φVX, the selection switch MVX is turned on to supply a signal supplied from the transfer switch MTX to the pixel amplifier MSF. That is, the selection unit 5j enables random access to a pixel by turning on both the selection switches MSEL and MVX to select the pixel.

For example, in thinning-out readout, the selection unit 5j selects the first group of readout rows from the first readout region RR1 in the first frame period (frame period F1). In the first frame period, the readout unit 80 reads out signals from the first readout region RR1 at the first pixel density. The first pixel density is obtained by dividing the number of pixels of the first group of readout rows by the number of pixels of the first readout region RR1.

Additionally, in thinning-out readout, the selection unit 5j selects the second group of readout rows from the second readout region RR2 in the second frame period (frame period F2 or F3). In the second frame period, the readout unit 80 reads out signals from the second readout region RR2 that is a part of the pixel array PA at the second pixel density higher than the first pixel density. The second pixel density is obtained by dividing the number of pixels of the second group of readout rows by the number of pixels of the second readout region RR2.

In the above description, the pixels of, for example, the row V14 start the charge accumulation operation in F1(n), and the pixels of, for example, the row V13 start the charge accumulation operation in F2(n). However, as is apparent from the above description, the φVSR-B input timing is changeable, and the charge accumulation operation need not always start at the above-described timings.

In this case, the control circuit 60 may include circuit elements corresponding to the plurality of column amplification units 21, 22, 23 and control the amplification factor of each of the plurality of column amplification units 21, 22, 23 for each pixel.

Figure 11:
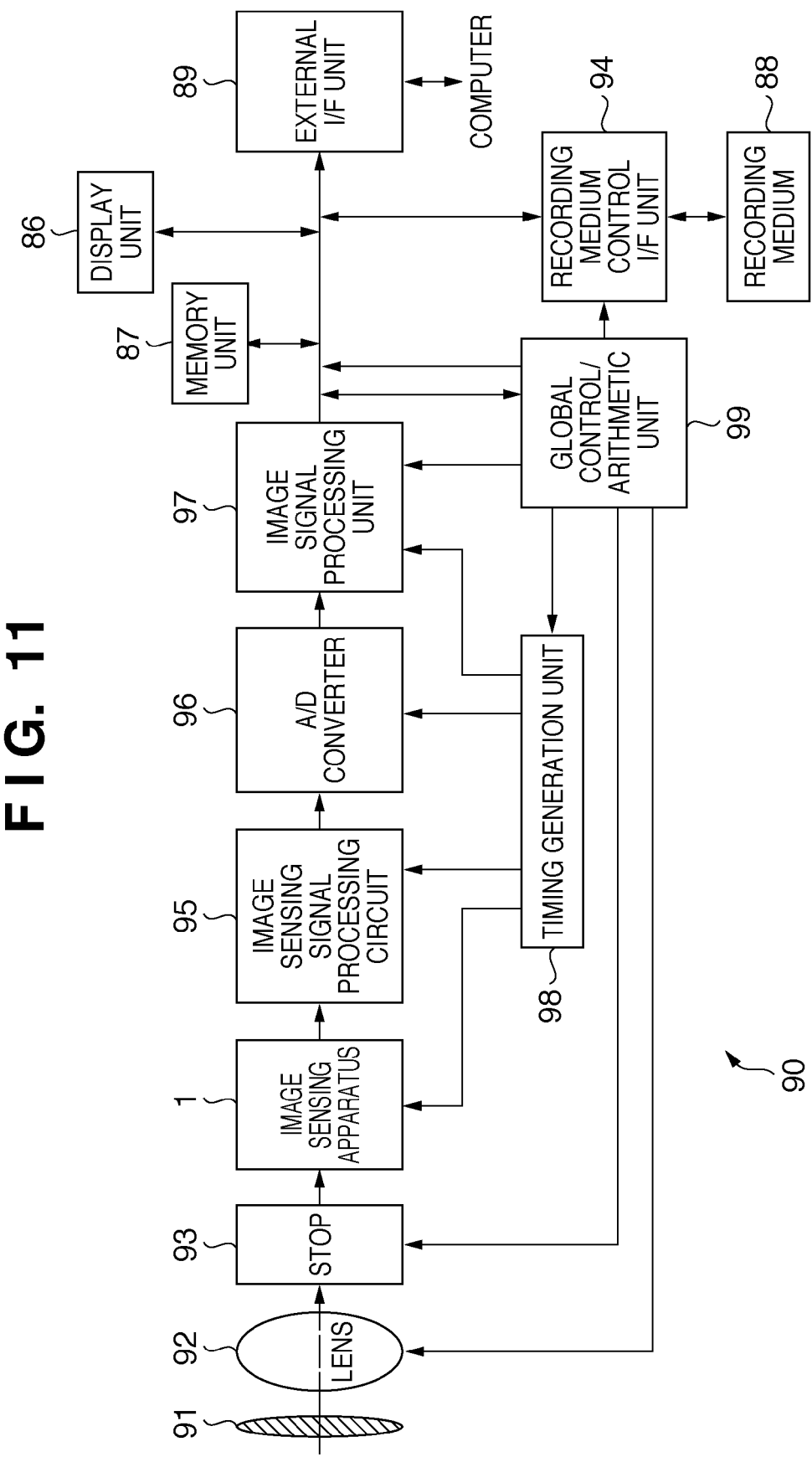
FIG. 11 is a block diagram showing the arrangement of an image capturing system to which the image sensing apparatus according to the first embodiment is applied.

An example of the arrangement of an image capturing system to which the image sensing apparatus according to the first embodiment is applied will be described next with reference to FIG. 11. FIG. 11 is a block diagram showing the arrangement of the image capturing system to which the image sensing apparatus according to the first embodiment is applied.

An image capturing system 90 mainly includes an optical system, image sensing apparatus 1, and a signal processing unit. The optical system mainly includes a shutter 91, lens 92, and stop 93. The signal processing unit mainly includes an image sensing signal processing circuit 95, A/D converter 96, image signal processing unit 97, memory unit 87, external I/F unit 89, timing generation unit 98, global control/arithmetic unit 99, recording medium 88, and recording medium control I/F unit 94. The signal processing unit need not always include the recording medium 88.

The shutter 91 is located in front of the lens 92 on the optical path to control exposure.

The lens 92 refracts incident light and forms an object image on the pixel array (imaging plane) of the image sensing apparatus 1.

The stop 93 is provided on the optical path between the lens 92 and the image sensing apparatus 1 to adjust the amount of light which passes through the lens 92 and is guided to the image sensing apparatus 1.

The image sensing apparatus 1 converts the object image formed on the pixel array into an image signal. The image sensing apparatus 1 reads out the pixel signal from the pixel array and outputs it.

The image sensing signal processing circuit 95 is connected to the image sensing apparatus 1 to process the image signal output from the image sensing apparatus 1.

The A/D converter 96 is connected to the image sensing signal processing circuit 95 to convert the processed image signal (analog signal) output from the image sensing signal processing circuit 95 into a digital signal.

The image signal processing unit 97 is connected to the A/D converter 96 to perform arithmetic processes such as various kinds of correction for the image signal (digital signal) output from the A/D converter 96, thereby generating image data. The image data is supplied to the memory unit 87, external I/F unit 89, global control/arithmetic unit 99, and recording medium control I/F unit 94.

The memory unit 87 is connected to the image signal processing unit 97 to store the image data output from the image signal processing unit 97.

A display unit 86 is connected to the image signal processing unit 97 to display an image corresponding to the image data output from the image signal processing unit 97.

The external I/F unit 89 is connected to the image signal processing unit 97 so that the image data output from the image signal processing unit 97 is transferred to an external device (e.g., personal computer) via the external I/F unit 89.

The timing generation unit 98 is connected to the image sensing apparatus 1, image sensing signal processing circuit 95, A/D converter 96, and image signal processing unit 97 to supply a timing signal to them. For example, the timing generation unit 98 supplies the above-described control signals φV1, φV2, φG, φM, and φH to the image sensing apparatus 1. The image sensing apparatus 1, image sensing signal processing circuit 95, A/D converter 96, and image signal processing unit 97 operate in synchronism with the timing signal.

The global control/arithmetic unit 99 is connected to the timing generation unit 98, image signal processing unit 97, display unit 86, and recording medium control I/F unit 94 to comprehensively control them. For example, the global control/arithmetic unit 99 selects the progressive scan mode or thinning-out readout mode based on, for example, an instruction input to an input unit (not shown) and controls the respective units in accordance with the selected mode.

The recording medium 88 is detachably connected to the recording medium control I/F unit 94. The image data output from the image signal processing unit 97 is recorded on the recording medium 88 via the recording medium control I/F unit 94.

With the above arrangement, when the image sensing apparatus 1 can obtain a good image signal, a good image (image data) can be obtained.

Figure 12:
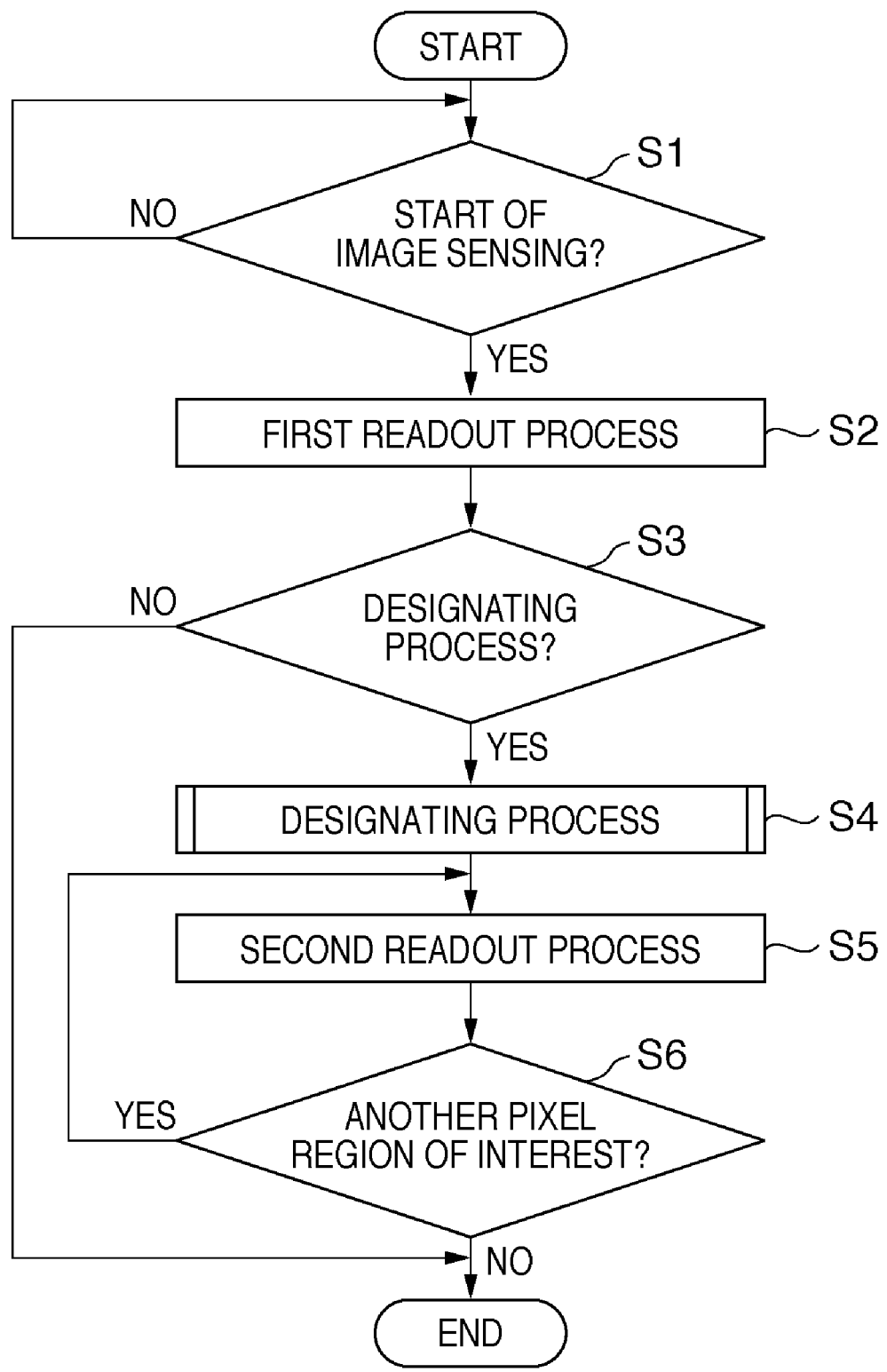
FIG. 12 is a flowchart illustrating an operation of causing an image capturing system 90 to sense an object.

An example of an operation of causing the image capturing system 90 to sense an object will be described next with reference to FIG. 12. FIG. 12 is a flowchart illustrating the operation of causing the image capturing system 90 to sense an object.

In step S1, the global control/arithmetic unit 99 judges whether to start image sensing in the thinning-out readout mode. More specifically, upon receiving a start instruction for starting image sensing in the thinning-out readout mode from the input unit (not shown), the global control/arithmetic unit 99 judges to start image sensing in the thinning-out readout mode. Without receiving the start instruction from the input unit, the global control/arithmetic unit 99 determines not to start image sensing in the thinning-out readout mode (to start image sensing in the progressive scan mode). If the global control/arithmetic unit 99 determines to start image sensing in the thinning-out readout mode, the process advances to step S2. Upon determining not to start image sensing in the thinning-out readout mode, the process returns to step S1.

In step S2, the timing generation unit 98 supplies the control signals ($\phi$V1, $\phi$V2, $\phi$G, $\phi$M, and $\phi$H) for performing the first readout process to the image sensing apparatus 1 in accordance with the start instruction. The image sensing apparatus 1 performs the first readout process. More specifically, the selection unit 5 causes the pixels of the rows (V4, V9, V14, V19, and V24) included in the first group of readout rows to perform the charge accumulation operation for the first accumulation period Ta. The first group of readout rows is a region selected from the entire pixel array PA. In the frame period F1 (FIG. 3), the readout unit 80 reads out, from each of the pixels of the rows (V4, V9, V14, V19, and V24) included in the first group of readout rows, the signal (SA) accumulated for the first accumulation period Ta of the pixels of each column and sequentially outputs the signal.

The image sensing signal processing circuit 95 processes the image signal (SA) output from the image sensing apparatus 1 and supplies the processed image signal to the A/D converter 96.

The A/D converter 96 converts the processed image signal (analog signal) output from the image sensing signal processing circuit 95 into a digital signal and outputs it to the image signal processing unit 97.

The image signal processing unit 97 executes arithmetic processes such as various kinds of correction for the image signal (digital signal) output from the A/D converter 96, thereby generating image data.

The global control/arithmetic unit 99 controls the image signal processing unit 97 and the display unit 86 so that the image signal processing unit 97 supplies the image data to the display unit 86, and the display unit 86 displays an image corresponding to the image data. The global control/arithmetic unit 99 also controls the image signal processing unit 97 and the memory unit 87 so that the image signal processing unit 97 supplies the image data to the memory unit 87, and the memory unit 87 stores the image data corresponding to the image signal (SA).

In step S3, the global control/arithmetic unit 99 determines whether to execute a designating process. More specifically, the user may input a designation instruction to designate a pixel region of interest from the display on the display unit 86 to the input unit (not shown). Upon receiving the designation instruction from the input unit, the global control/arithmetic unit 99 determines to execute the designating process. Without receiving the designation instruction from the input unit, the global control/arithmetic unit 99 determines not to execute the designating process. If the global control/arithmetic unit 99 determines to execute the designating process, the process advances to step S4. Upon determining not to execute the designating process, the process ends.

In step S4, the global control/arithmetic unit 99 executes the designating process and causes the memory unit 87 to store the result of the process. The designating process will be described later in detail.

In step S5, the timing generation unit 98 refers to the memory unit 87 and supplies the control signals ($\phi$V1, $\phi$V2, $\phi$G, $\phi$M, and $\phi$H) for performing the second readout process to the image sensing apparatus 1 in accordance with what is designated by the designating process. The image sensing apparatus 1 performs the second readout process. More specifically, the selection unit 5 causes the pixels of the rows (V13 to V20) included in the second group of readout rows to perform the charge accumulation operation for the second accumulation period Taa. The second group of readout rows is a region selected from a region corresponding to the pixel region RI of interest of the pixel array PA.

In the frame period F2 (FIG. 3), the readout unit 80 reads out, from each of the pixels of the rows (V14 and V19) included in the first group of readout rows and the second group of readout rows, the signal (SA') of the pixels of each column and sequentially outputs the signal. The signal (SA') is accumulated for the second accumulation period Taa.

The image sensing signal processing circuit 95 processes the image signal (SA') output from the image sensing apparatus 1 and supplies the processed image signal to the A/D converter 96.

The A/D converter 96 converts the processed image signal (analog signal) output from the image sensing signal processing circuit 95 into a digital signal and outputs it to the image signal processing unit 97.

The image signal processing unit 97 executes arithmetic processes such as various kinds of correction for the image signal (digital signal) output from the A/D converter 96, thereby generating image data corresponding to the image signal (SA'). The image signal processing unit 97 also acquires image data corresponding to the image signal (SA') from the memory unit 87. The image signal processing unit 97 synthesizes the image data corresponding to the image signal (SA) with the image data corresponding to the image signal (SA').

The global control/arithmetic unit 99 controls the image signal processing unit 97 and the display unit 86 so that the image signal processing unit 97 supplies the synthesized image data to the display unit 86, and the display unit 86 displays an image corresponding to the image data. The global control/arithmetic unit 99 also controls the image signal processing unit 97 and the memory unit 87 so that the image signal processing unit 97 supplies the image data to the memory unit 87, and the memory unit 87 stores the synthesized image data.

In the frame period F3 (FIG. 3), the readout unit 80 reads out, from each of the pixels of the rows (V13, V15 to V18, and V20) which are not included in the first group of readout rows but included in the second group of readout rows, the signal (SB') of the pixels of each column and sequentially outputs the signal. The signal (SB') is accumulated for the second accumulation period Taa.

The image sensing signal processing circuit 95 processes the image signal (SB') output from the image sensing apparatus 1 and supplies the processed image signal to the A/D converter 96.

The A/D converter 96 converts the processed image signal (analog signal) output from the image sensing signal processing circuit 95 into a digital signal and outputs it to the image signal processing unit 97.

The image signal processing unit 97 executes arithmetic processes such as various kinds of correction for the image signal (digital signal) output from the A/D converter 96, thereby generating image data corresponding to the image signal (SB'). The image signal processing unit 97 also acquires the synthesized image data from the memory unit 87. If the pixels of the rows (V13, V15 to V18, and V20) included in the second readout region RR2 have performed the charge accumulation operation for the first accumulation period Ta, the image signal processing unit 97 further synthesizes the synthesized image data with the image data corresponding to the image signal (SB').

The global control/arithmetic unit 99 controls the image signal processing unit 97 and the display unit 86 so that the image signal processing unit 97 supplies the synthesized image data to the display unit 86, and the display unit 86 displays an image corresponding to the image data. Accordingly, the display unit 86 displays an image of a portion corresponding to the pixel region RI of interest at a high resolution without blooming and also displays, at a low resolution, an image of another portion corresponding to a region except the pixel region RI of interest from the pixel array PA.

In step S6, the global control/arithmetic unit 99 determines whether another pixel region of interest exists. More specifically, the global control/arithmetic unit 99 refers to the memory unit 87 and determines whether the plurality of designated regions include another region that is the second readout region where no signals have been read out. If the global control/arithmetic unit 99 determines that another pixel region of interest exists, the process returns to step S5. Upon determining that no other pixel region of interest exists, the process ends.

Figure 13:
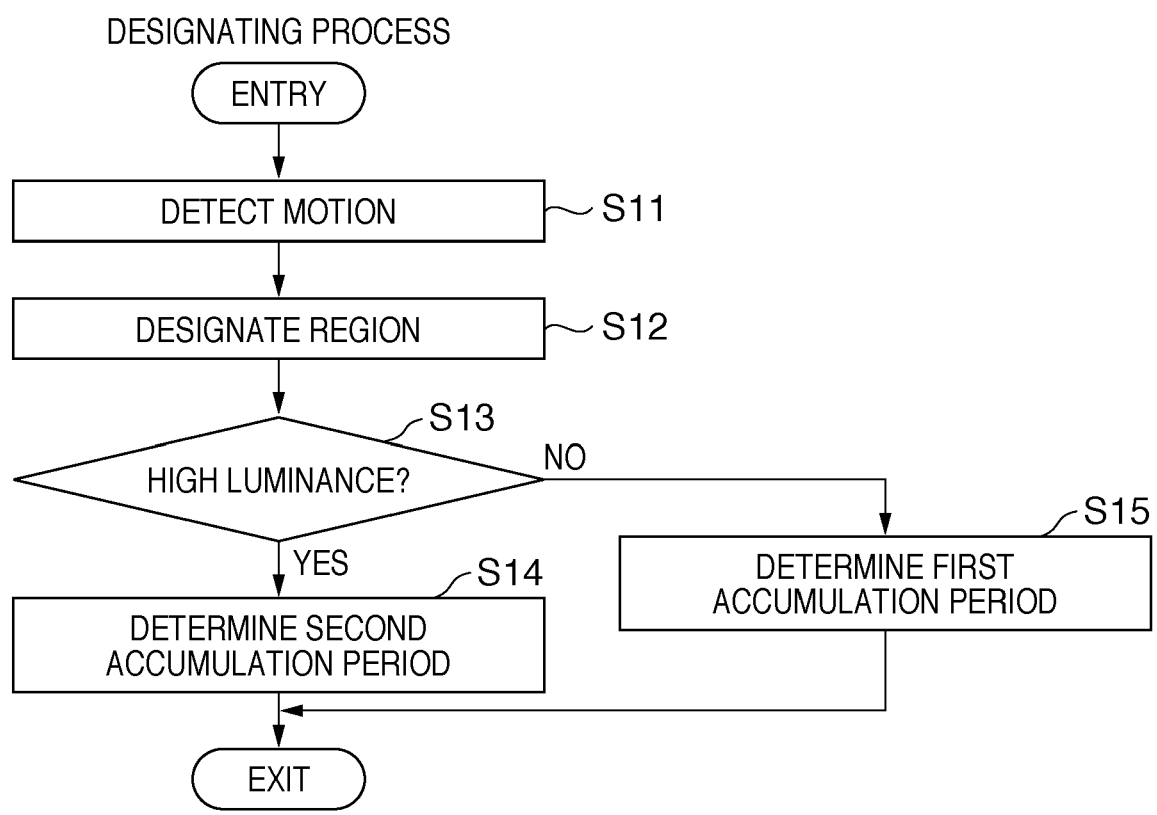
FIG. 13 is a flowchart illustrating the sequence of a designating process.

The sequence of the designating process will be described next with reference to FIG. 13. FIG. 13 is a flowchart illustrating an example of the sequence of the designating process.

In step S11, the global control/arithmetic unit 99 controls the image signal processing unit 97 and the memory unit 87 to supply the image data in the plurality of frame periods, which are stored in the memory unit 87, to the image signal processing unit 97. The image signal processing unit 97 detects the motion of an object in the image represented by the image data on the basis of the image data in the plurality of frame periods. This detection operation is performed by, for example, removing noise from a signal obtained by a differential process of an image signal between image sensing frames or by an object determination process.

In step S12, the global control/arithmetic unit 99 designates a pixel region of interest. More specifically, the global control/arithmetic unit 99 controls the image signal processing unit 97 to extract the region including the object in the image corresponding to the image data. The image signal processing unit 97 extracts a region corresponding to the pixel region RI of interest (FIG. 3) as the region including the object and supplies the extracted region to the global control/arithmetic unit 99. The global control/arithmetic unit 99 designates the pixel region RI of interest based on the information (e.g., the information of pixel addresses) of the region corresponding to the pixel region RI of interest. The global control/arithmetic unit 99 causes the memory unit 87 to store the information of the designated pixel region RI of interest.

In step S13, the image signal processing unit 97 determines whether the image of the portion corresponding to the pixel region RI of interest includes a high-luminance portion. If the image signal processing unit 97 determines that a high-luminance portion exists, the process advances to step S14. Upon determining that no high-luminance portion exists, the process advances to step S15.

In step S14, the global control/arithmetic unit 99 determines the length of the second accumulation period. More specifically, the global control/arithmetic unit 99 receives the luminance information of the pixel region RI of interest from the image signal processing unit 97. The global control/arithmetic unit 99 calculates a value serving as an index such as the average value of the luminance of the pixel region RI of interest and determines, based on the calculation result, the length of the second accumulation period. The global control/arithmetic unit 99 causes the memory unit 87 to further store the information of the second accumulation period as the information of the designated pixel region RI of interest.

In step S15, the global control/arithmetic unit 99 determines the information of the designated pixel region of interest to information preset as a default and causes the memory unit 87 to store the determined information.

It should be noted that, in step S12 shown in FIG. 13, the global control/arithmetic unit 99 may designate a plurality of pixel regions RI and RI3 of interest. For example, the global control/arithmetic unit 99 controls the image signal processing unit 97 to determine that the luminance of the image of a portion corresponding to the pixel region RI3 of interest is equal to or smaller than a lower threshold value.

Figure 14:
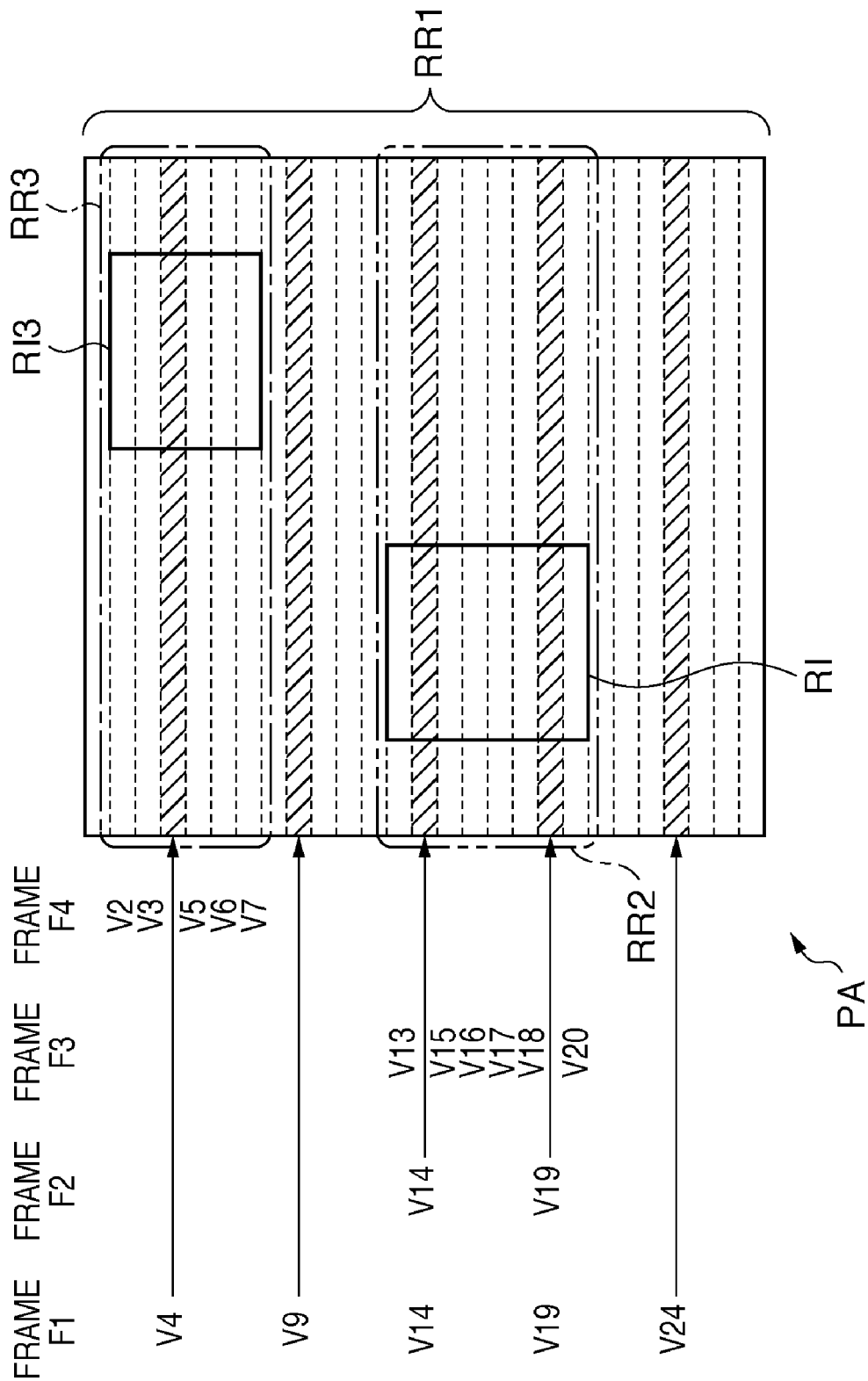
FIG. 14 is a view for explaining a readout region and a non-readout region in the pixel array PA (modification)
Figure 15:
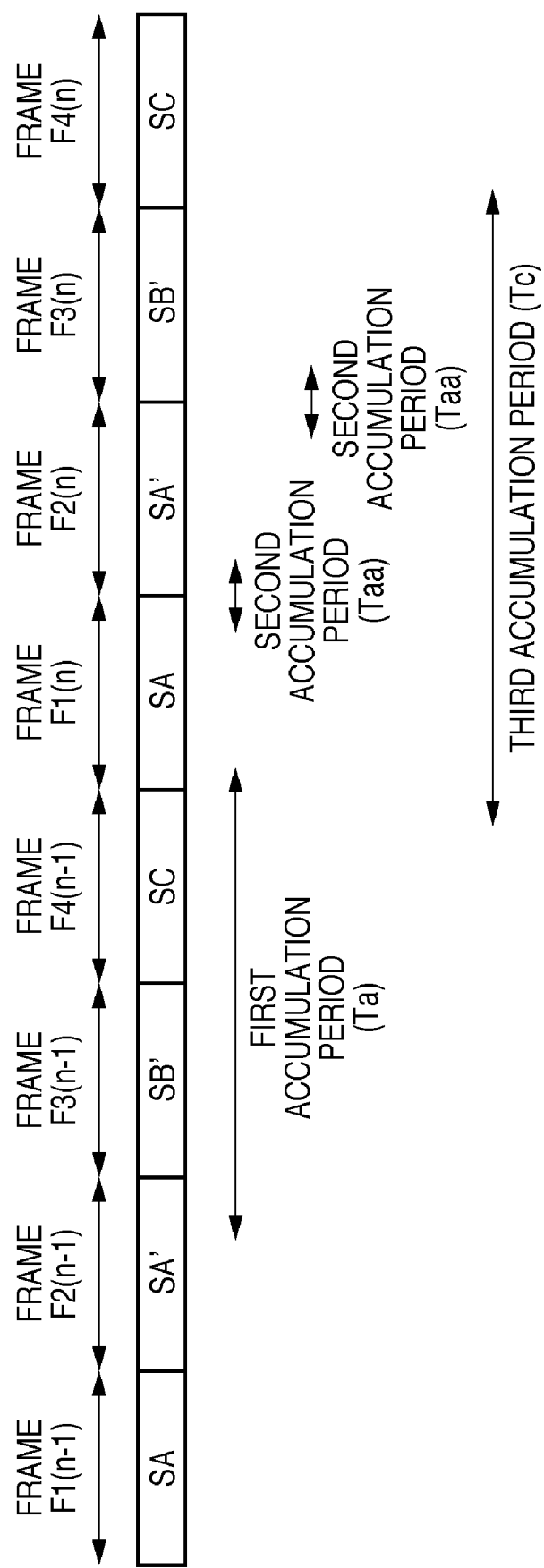
FIG. 15 is a view for explaining a charge accumulation period (modification)

In this case, as shown in FIG. 14, the vertical scanning circuit VSR-A of the image sensing apparatus 1 selects a third group of readout rows V2 to V7 from a third readout region RR3 in a frame period F4. More specifically, the vertical scanning circuit VSR-A sequentially selects the rows V2, V3, and V5 to V7 which are not included in the first group of readout rows but included in the third group of readout rows. The vertical scanning circuit VSR-A skips the rows V1, V4, and V8 to V27 excluding the rows V2, V3, and V5 to V7 included in the third group of readout rows in the entire pixel array PA. The vertical scanning circuit VSR-A causes the pixels of the rows (V2, V3, and V5 to V7) which are not included in the first group of readout rows but included in the third group of readout rows to perform the charge accumulation operation for a third accumulation period Tc. Since the luminance in the third readout region RR3 is low, the third accumulation period Tc is longer than the first accumulation period Ta, as shown in FIG. 15.

In the frame period F4, the readout unit 80 reads out, from each of the pixels of the rows (V2, V3, and V5 to V7) which are not included in the first group of readout rows but include in the third group of readout rows, a signal (SC) accumulated for the third accumulation period Tc of the pixels of each column and sequentially outputs the signal.

As described above, when the object has a low-luminance portion, the time of the charge accumulation operation to be performed by the pixels corresponding to that portion is made longer than the first accumulation period. It is therefore possible to further widen the dynamic range of a signal read out from the pixel region of interest of the pixel array.

Alternatively, it should be noted that, in step S12 shown in FIG. 13, the global control/arithmetic unit 99 may designate a plurality of pixel regions RI and RI3a of interest. For example, the global control/arithmetic unit 99 controls the image signal processing unit 97 to determine that the luminance of the image of a portion corresponding to the pixel region RI3a of interest is equal to or smaller than a lower threshold value.

Figure 16:
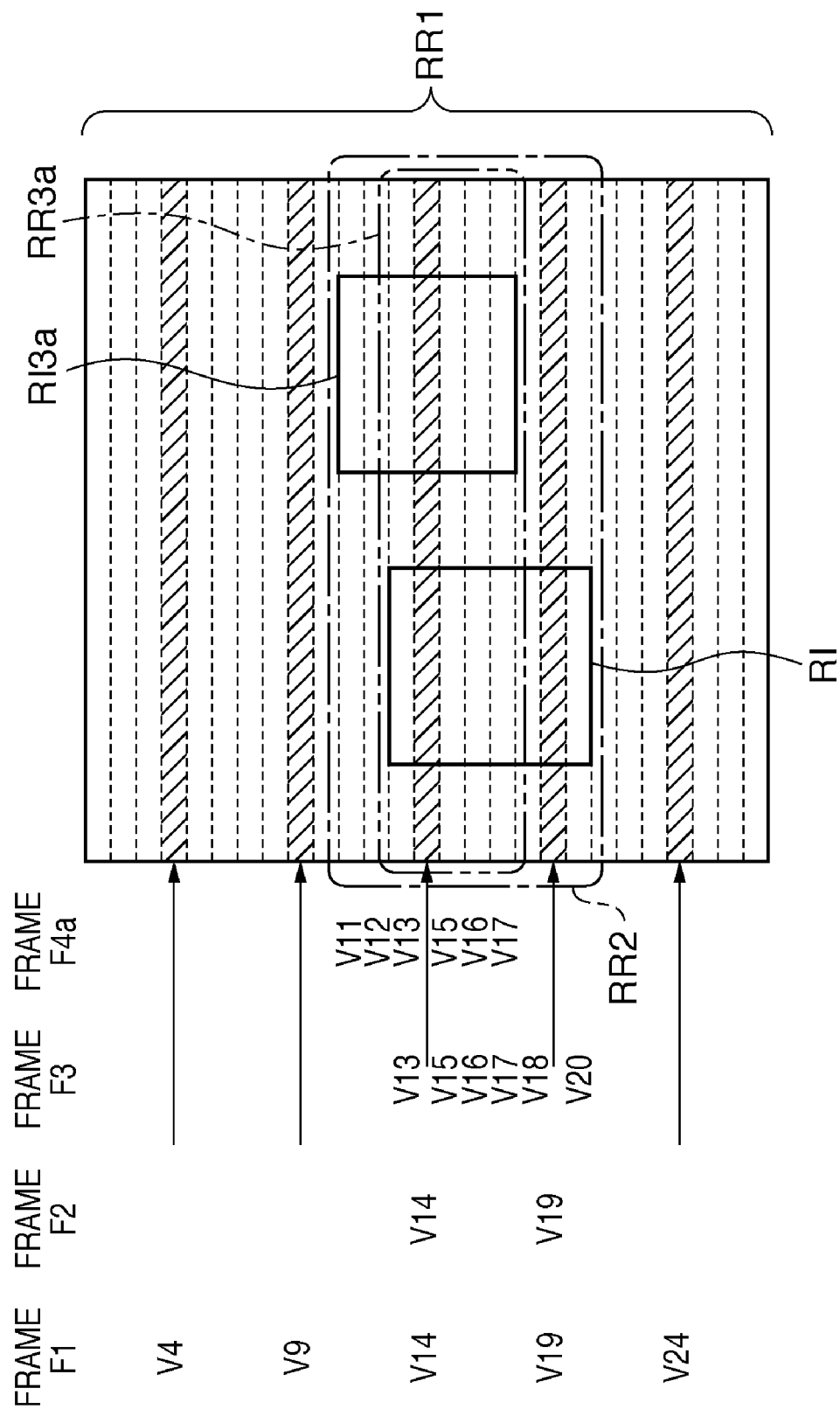
FIG. 16 is a view for explaining a readout region and a non-readout region in the pixel array PA (modification)

In this case, as shown in FIG. 16, the vertical scanning circuit VSR-A of the image sensing apparatus 1 selects the third group of readout rows V11 to V17 from a third readout region RR3a in a frame period F4a. More specifically, the vertical scanning circuit VSR-A sequentially selects the rows V11 to V13, and V15 to V17 which are not included in the first group of readout rows but included in the third group of readout rows. The vertical scanning circuit VSR-A skips the rows V1 to V10, and V18 to V27 excluding the rows V11 to V13, and V15 to V17 included in the third group of readout rows in the entire pixel array PA. The vertical scanning circuit VSR-A causes the pixels of the rows (V11 to V13, and V15 to V17) which are not included in the first group of readout rows but included in the third group of readout rows to perform the charge accumulation operation for the third accumulation period Tc. The third accumulation period Tc is longer than the first accumulation period Ta, as shown in FIG. 15.

In the pixel array PA, the rows V13, and V15 to V17 are included in both the high-luminance pixel region RI of interest and the low-luminance pixel region RI3a of interest. Even in this case, the pixels of the rows V13, and V15 to V17 perform the charge accumulation operation for the second accumulation period Taa and third accumulation period Tc. It is therefore possible to further widen the dynamic range of a signal read out from the pixel region of interest of the pixel array.

In step S12 shown in FIG. 13, the global control/arithmetic unit 99 may designate a plurality of pixel regions RI and RI3b of interest. Assume that the rows V13, and V15 to V17 are included in both the high-luminance pixel region RI of interest and the low-luminance pixel region RI3a of interest in the pixel array PA. For example, the global control/arithmetic unit 99 controls the image signal processing unit 97 to determine that the luminance of the image of a portion corresponding to the pixel region RI3b of interest is equal to or smaller than an upper threshold value.

Figure 17:
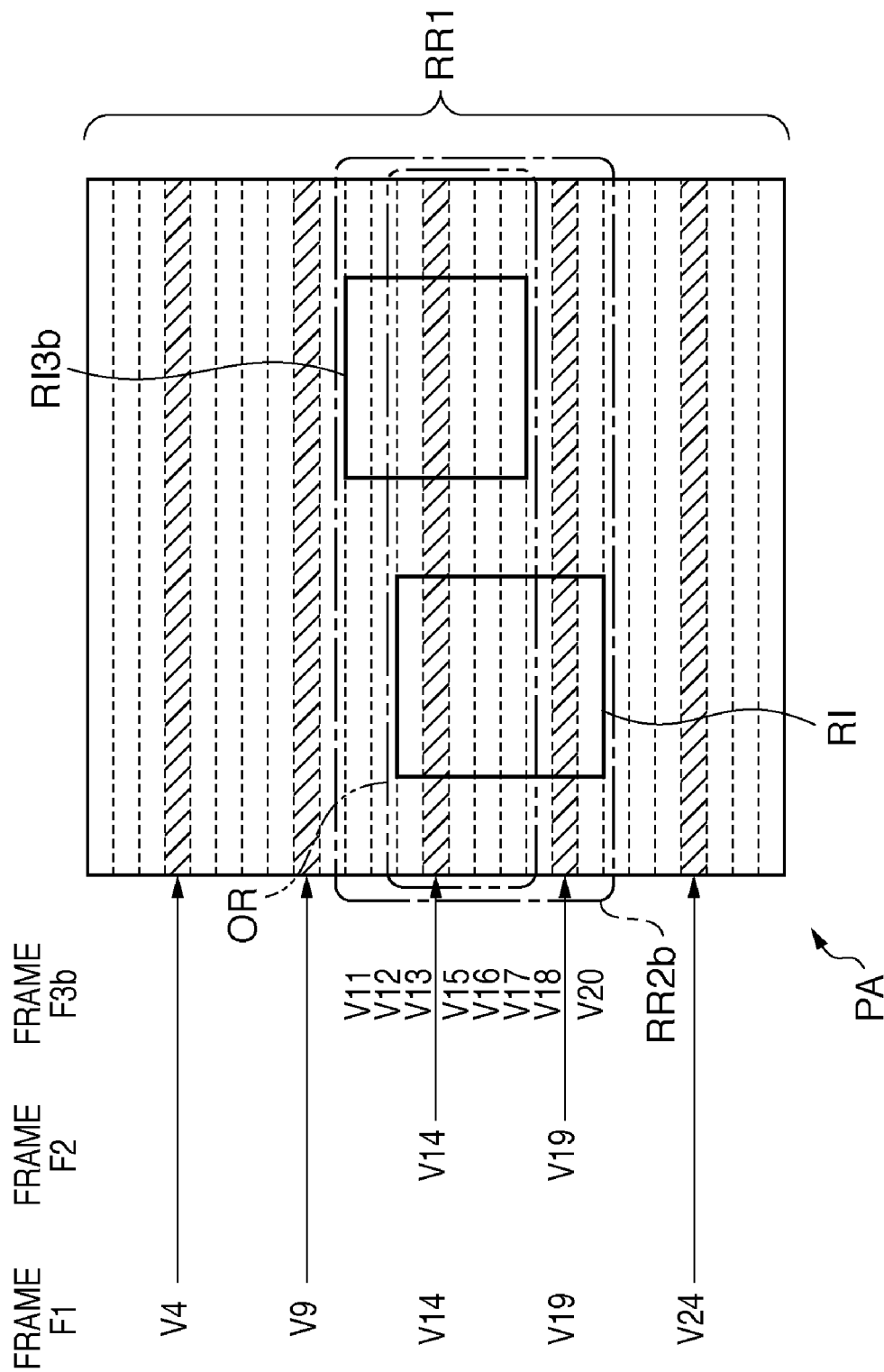
FIG. 17 is a view for explaining a readout region and a non-readout region in the pixel array PA (modification)

In this case, in a frame period F3b, the vertical scanning circuit VSR-A sequentially selects the rows V11 to V13, V15 to V18, V20, and V21 included in the second group of readout rows (as the readout region in the frame period F3b) (FIG. 17). A second readout region RR2b corresponds to both the pixel region RI of interest and the pixel region RI3b of interest and is represented by the union of the rows included in the pixel region RI of interest and those included in the pixel region RI3b of interest.

In the pixel array PA, the rows V13, and V15 to V17 are included in both the high-luminance pixel region RI of interest and the high-luminance pixel region RI3b of interest. Even in this case, the pixels of the rows V13, and V15 to V17 perform the charge accumulation operation for the second accumulation period Taa. It is therefore possible to further widen the dynamic range of a signal read out from the pixel region of interest of the pixel array.

Figure 18:
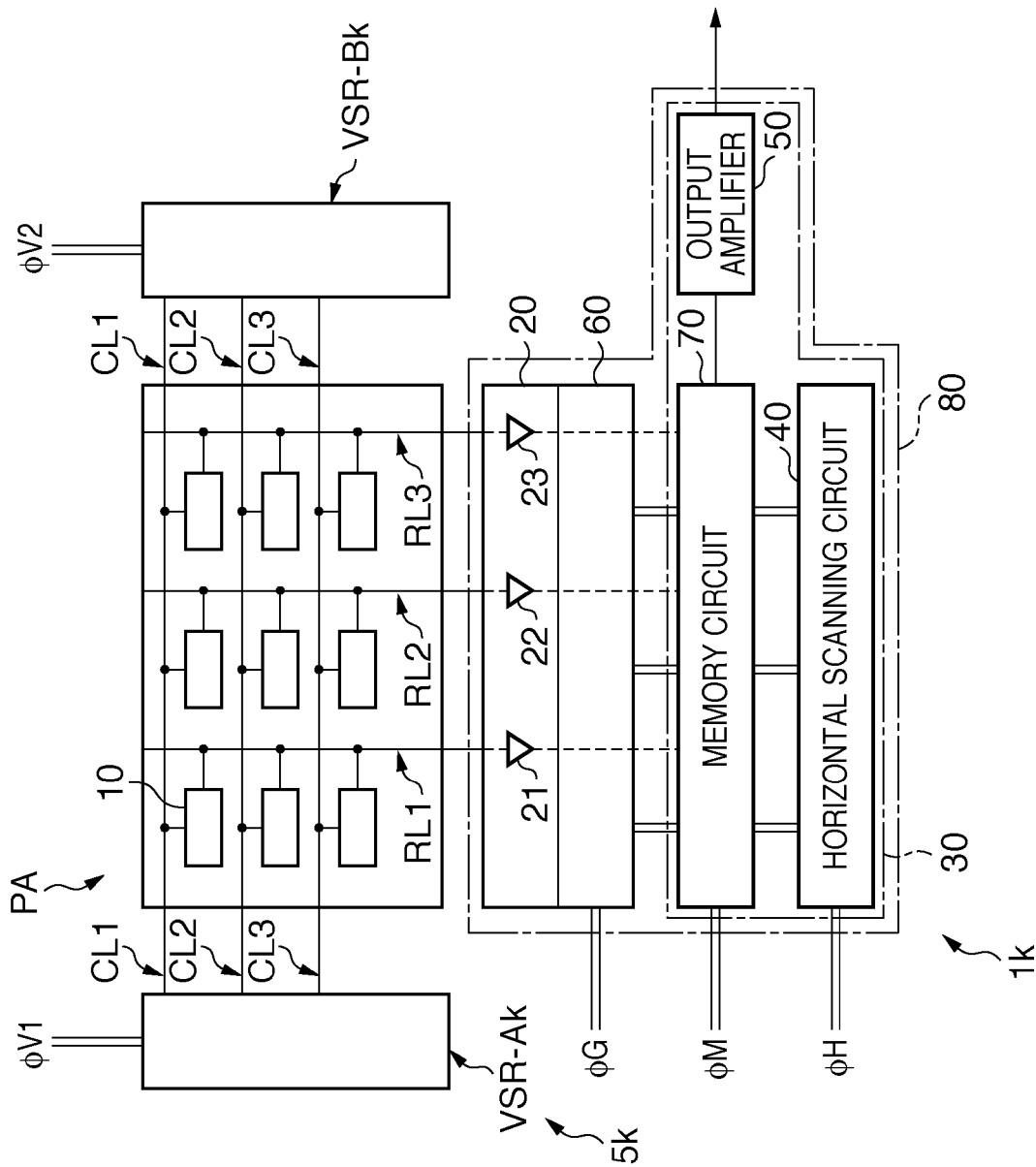
FIG. 18 is a block diagram showing the arrangement of an image sensing apparatus 1k according to the second embodiment of the present invention.

An image sensing apparatus 1k according to the second embodiment of the present invention will be described next. FIG. 18 is a block diagram showing the arrangement of the image sensing apparatus 1k according to the second embodiment of the present invention. Portions different from the first embodiment will mainly be described, and a description of the same portions will not be repeated.

The image sensing apparatus 1k according to the second embodiment of the present invention is different from the first embodiment in that it includes a selection unit 5k. The selection unit 5k is different from the first embodiment in that it operates in the following way.

Figure 19:
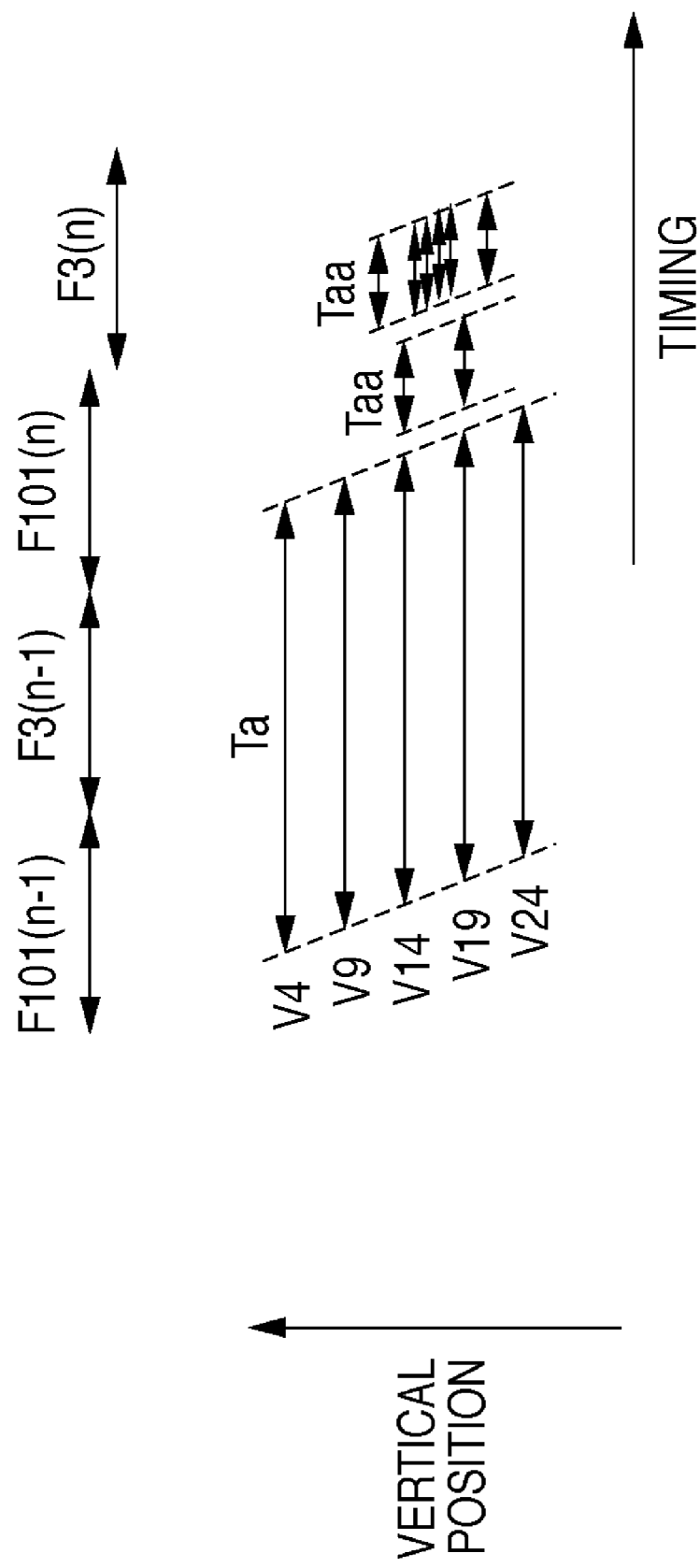
FIG. 19 is a view for explaining the slit rolling reset operation of the image sensing apparatus 1k.

As shown in FIG. 19, in a previous frame period F101(n−1), rows (V4, V9, V14, V19, and V24) included in the first group of readout rows are sequentially selected, and a first accumulation period Ta of the pixels included in the rows sequentially starts.

In a current frame period F101(n), the rows (V14 and V19) included in the first group of readout rows and the second group of readout rows are sequentially selected, and a second accumulation period Taa of the pixels included in the rows sequentially finishes. For example, a selection unit VSR-A allows signal readout from the pixels of the row V14 in accordance with a scanning signal φVSR-A of the row V14 to finish the charge accumulation operation and finish the second accumulation period Taa of the row V14.

Rows (V13, V15 to V18, and V20) which are not included in the first group of readout rows but included in the second group of readout rows are sequentially selected, and the second accumulation period Taa of the pixels included in the rows sequentially starts (FIG. 6). For example, a selection unit VSR-B resets the pixels of the row V13 in accordance with a scanning signal φVSR-B of the row V13 and finishes the reset to start the charge accumulation operation and start the second accumulation period Taa of the row V13.

That is, the selection unit 5k drives the pixels in a pixel array PA so that the operation in the frame period F1 and that in the frame period F2 of the first embodiment are performed in the frame period F101. This further shortens the time for reading out a signal from the pixel array PA.

The accumulation period in the next cycle is not illustrated in FIG. 19.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-190118, filed Jul. 20, 2007 which is hereby incorporated by reference herein in its entirety.

What is claimed is:

1. An image sensing apparatus comprising:
a pixel array including a plurality of pixels arrayed in a row direction and a column direction;
a selection unit, which selects a readout region in the pixel array; and
a readout unit, which reads out a signal from the readout region selected by the selection unit, wherein,
in a thinning-out readout, the readout unit reads out signals from a first readout region corresponding to an entirety of the pixel array at a first pixel density in a first frame period and reads out signals from a second readout region corresponding to a part of the pixel array at a second pixel density in a second frame period, the second pixel density being higher than the first pixel density, wherein all pixels in the first readout region whose signals are read out in the first frame period do not include pixels in the second readout region whose signals are read out in the second frame period, and,
in the thinning-out readout, the selection unit causes the pixels in the first readout region to perform a charge accumulation operation for a first accumulation period and causes the pixels in the second readout region to perform the charge accumulation operation for a second accumulation period, a length of time of the second accumulation period being different from that of the first accumulation period.

2. The apparatus according to claim 1, wherein the selection unit causes at least a part of the pixels in the first readout region to perform the accumulation operation for the second accumulation period in a frame period that is different from the first accumulation period.

3. The apparatus according to claim 1, wherein the selection unit causes at least a part of the pixels in the second readout region to perform the accumulation operation for the first accumulation period in a frame period that is different from the second accumulation period.

4. The apparatus according to claim 1, wherein the selection unit selects a row in the readout region, and, in the thinning-out readout, the readout unit reads out signals from a part of rows in the first readout region in the first frame period.

5. The apparatus according to claim 4, wherein the readout unit includes:
- a plurality of column amplification units each of which amplifies signals of pixels of each column, and
- an output unit, which sequentially outputs the signals amplified by the plurality of column amplification units, and
- an amplification factor for signal amplification of each of the plurality of column amplification units is controlled for each row.

6. The apparatus according to claim 1, wherein the selection unit selects a pixel in the readout region, and, in the thinning-out readout, the readout unit reads out signals from pixels included in a part of rows and a part of columns in the first readout region in the first frame period.

7. The apparatus according to claim 6, wherein the readout unit includes:
- a plurality of column amplification units each of which amplifies signals of pixels of each column, and
- an output unit, which sequentially outputs the signals amplified by the plurality of column amplification units, and
- an amplification factor for signal amplification of each of the plurality of column amplification units is controlled for each pixel.

8. The apparatus according to claim 1, wherein the selection unit causes pixels that are included in the first readout region but not included in the second readout region to perform the charge accumulation operation for the first accumulation period and causes pixels that are included in the second readout region to perform the charge accumulation operation for the first accumulation period and the second accumulation period in frame periods different from each other.

9. An image sensing apparatus according to claim 1, wherein the image sensing apparatus is included in an image capturing system that includes:
- an optical system, which forms an image on an imaging plane of the image sensing apparatus; and
- a signal processing unit, which processes a signal output from the image sensing apparatus to generate image data,
- wherein the signal processing unit determines the first accumulation period based on a luminance of a signal read out from the first readout region and controls the selection unit of the image sensing apparatus to cause the pixels in the first readout region to perform the charge accumulation operation for the first accumulation period, and determines the second accumulation period based on a luminance of a signal read out from the second readout region and controls the selection unit of the image sensing apparatus to cause the pixels in the second readout region to perform the charge accumulation operation for the second accumulation period.

10. The apparatus according to claim 1, wherein the pixels in the second readout region whose signals are read out in the second frame are reset at a timing within the charge accumulation operation that is performed for the pixels in the first readout region whose signals are read out in the first frame.

11. A method of operating an image sensing apparatus having a pixel array including a plurality of pixels arrayed in a row direction and a column direction, the method comprising:
- reading out signals from a first readout region corresponding to an entirety of the pixel array at a first pixel density in a first frame period; and
- reading out signals from a second readout region corresponding to a part of the pixel array at a second pixel density in a second frame period, the second pixel density being higher than the first pixel density, wherein all pixels in the first readout region whose signals are read out in the first frame period do not include pixels in the second readout region whose signals are read out in the second frame period,
- wherein a length of time of a charge accumulation period for the pixels in the first readout region is different from that for the pixels in the second readout region.

* * * * *